US012613476B2

(12) United States Patent
Sasaki et al.

(10) Patent No.: US 12,613,476 B2
(45) Date of Patent: Apr. 28, 2026

(54) ELECTROPHOTOGRAPHIC PHOTORECEPTOR, PROCESS CARTRIDGE, AND IMAGE FORMING APPARATUS

(71) Applicant: FUJIFILM Business Innovation Corp., Tokyo (JP)

(72) Inventors: Tomoya Sasaki, Kanagawa (JP); Ryosuke Fujii, Kanagawa (JP); Kohei Hashimoto, Kanagawa (JP); Hiroko Kobayashi, Kanagawa (JP); Yuto Okazaki, Kanagawa (JP); Kosuke Narita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 803 days.

(21) Appl. No.: 17/949,244

(22) Filed: Sep. 21, 2022

(65) Prior Publication Data

US 2023/0107087 A1 Apr. 6, 2023

(30) Foreign Application Priority Data

Sep. 24, 2021 (JP) ................................ 2021-156204
Jul. 25, 2022 (JP) ................................ 2022-118289

(51) Int. Cl.
*G03G 5/047* (2006.01)
*G03G 5/05* (2006.01)
(Continued)

(52) U.S. Cl.
CPC ............ *G03G 5/047* (2013.01); *G03G 5/056* (2013.01); *G03G 5/06142* (2020.05);
(Continued)

(58) Field of Classification Search
CPC ............... G03G 5/047; G03G 5/06145; G03G 5/06142; G03G 5/056; G03G 5/0668; G03G 5/0672; G03G 15/75
See application file for complete search history.

(56) References Cited

U.S. PATENT DOCUMENTS 10,031,430 B2 7/2018 Ogaki et al.
10,539,888 B2 1/2020 Kaku et al.
(Continued)

FOREIGN PATENT DOCUMENTS

JP 2001265021 9/2001
JP 2001265022 9/2001
(Continued)

*Primary Examiner* — Mark F. Huff
*Assistant Examiner* — Boone Alexander Evans
(74) *Attorney, Agent, or Firm* — JCIPRNET

(57) ABSTRACT

An electrophotographic photoreceptor includes a charge transport layer, the charge transport layer contains a polyester resin (1) having a dicarboxylic acid unit (A) represented by Formula (A) and a diol unit (B) represented by Formula (B), and a charge transport material, and in a case where a value A is a weight-average molecular weight Mw of the polyester resin (1) contained in the charge transport layer divided by 10,000 (A=Mw/10,000), a value of a ratio M1/M2 of a mass M1 of the charge transport material contained in the charge transport layer to a mass M2 of the charge transport layer is defined as Cs, and an average thickness of the charge transport layer is defined as Ds (μm), expressions of $5 \leq A \leq 40$, $0.28 \leq Cs \leq 0.55$, $27 \leq Ds \leq 50$, and $2.5 \leq (A \times Ds)/(Cs \times 100) \leq 70.0$ are satisfied.
(Continued)

Formula (A)

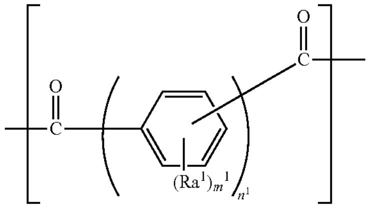

Formula (B)

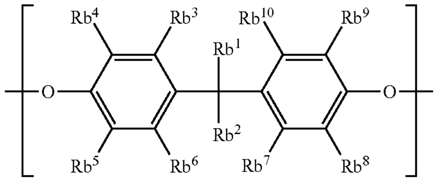

20 Claims, 3 Drawing Sheets

(51) Int. Cl.
*G03G 5/06* (2006.01)
*G03G 15/00* (2006.01)

(52) U.S. Cl.
CPC ....... *G03G 5/06145* (2020.05); *G03G 5/0668* (2013.01); *G03G 5/0672* (2013.01); *G03G 15/75* (2013.01)

(56) References Cited

U.S. PATENT DOCUMENTS

| | | | | |
|---|---|---|---|---|
| 11,106,147 | B2 | 8/2021 | Kudoh | |
| 2014/0011127 | A1 * | 1/2014 | Nakamura | G03G 5/0651 399/159 |
| 2020/0233322 | A1 | 7/2020 | Choda et al. | |
| 2021/0286277 | A1 | 9/2021 | Shimizu | |

FOREIGN PATENT DOCUMENTS

| | | |
|---|---|---|
| JP | 3785019 | 6/2006 |
| JP | 3868180 | 1/2007 |
| JP | 2013097300 | 5/2013 |
| JP | 2016133795 | 7/2016 |
| JP | 2017146548 | 8/2017 |
| JP | 6380124 | 8/2018 |
| JP | 2018159087 | 10/2018 |
| JP | 2019012141 | 1/2019 |
| JP | 2019035900 | 3/2019 |
| JP | 6500996 | 4/2019 |
| JP | 2021015223 | 2/2021 |
| JP | 2021071565 | 5/2021 |
| JP | 2021117377 | 8/2021 |
| JP | 2021148818 | 9/2021 |
| WO | 2017073176 | 5/2017 |
| WO | 2019070003 | 4/2019 |

* cited by examiner

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2021-156204 filed Sep. 24, 2021 and No. 2022-118289 filed Jul. 25, 2022.

BACKGROUND

(i) Technical Field

The present invention relates to an electrophotographic photoreceptor, a process cartridge, and an image forming apparatus.

(ii) Related Art

JP2001-265021A discloses an electrophotographic photoreceptor including a photosensitive layer that contains a polyester resin having a biphenyl structure as a repeating unit.

JP2001-265022A discloses an electrophotographic photoreceptor including a photosensitive layer that contains a polyester resin having a biphenyl structure and a bisphenol structure as repeating units.

JP2016-133795A discloses an electrophotographic photoreceptor including a photosensitive layer that contains a polyester resin having, for example, a diphenyl ether-4,4'-dicarboxylic acid unit, for example, a 4,4'-diphenyldicarboxylic acid unit, and for example, a 2,2-bis(4-hydroxy-3-methylphenyl)propane unit as repeating structures.

WO2017/073176A discloses an electrophotographic photoreceptor including a photosensitive layer that contains a polyarylate resin having a 4,4'-diphenyldicarboxylic acid unit and a 2,2-bis(4-hydroxyphenyl)butane unit as repeating structures.

JP2017-146548A discloses an electrophotographic photoreceptor including a surface layer that contains a polyester resin having a 2,6-naphthalenedicarboxylic acid unit, a diphenyl ether-4,4'-dicarboxylic acid unit, and a bisphenol unit as constitutional units.

SUMMARY

Aspects of non-limiting embodiments of the present disclosure relates to an electrophotographic photoreceptor with excellent electrical characteristics, from which a photosensitive layer is unlikely to be peeled off.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above-described object includes the following aspects.

According to an aspect of the present disclosure, there is provided an electrophotographic photoreceptor including a conductive substrate, and a lamination type photosensitive layer disposed on the conductive substrate and including a charge generation layer and a charge transport layer, in which the charge transport layer contains a polyester resin (1) having a dicarboxylic acid unit (A) represented by Formula (A) and a diol unit (B) represented by Formula (B), and a charge transport material, and in a case where a value A is a weight-average molecular weight Mw of the polyester resin (1) contained in the charge transport layer divided by 10,000 (A=Mw/10,000), a value of a ratio M1/M2 of a mass M1 of the charge transport material contained in the charge transport layer to a mass M2 of the charge transport layer is defined as Cs, and an average thickness of the charge transport layer is defined as Ds (μm), expressions of $5 \leq A \leq 40$, $0.28 \leq Cs \leq 0.55$, $27 \leq Ds \leq 50$, and $2.5 \leq (A \times Ds)/(Cs \times 100) \leq 70.0$ are satisfied.

BRIEF DESCRIPTION OF THE DRAWINGS

Exemplary embodiment(s) of the present invention will be described in detail based on the following figures, wherein.

DETAILED DESCRIPTION

Figure 1:
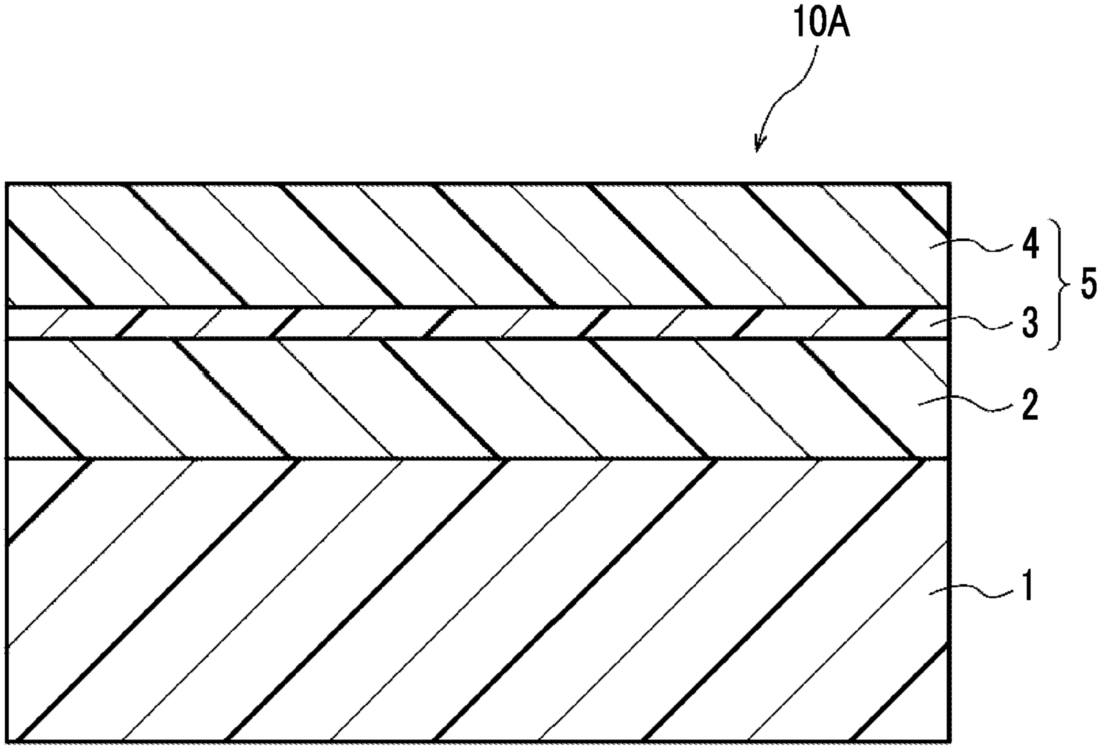
FIG. 1 is a partial cross-sectional view showing an example of a layer configuration of an electrophotographic photoreceptor according to a first exemplary embodiment.

Hereinafter, exemplary embodiments of the present disclosure will be described. The following descriptions and examples merely illustrate the exemplary embodiments, and do not limit the scope of the exemplary embodiments.

In the present disclosure, a numerical range shown using "to" indicates a range including numerical values described before and after "to" as a minimum value and a maximum value.

In a numerical range described in a stepwise manner in the present disclosure, an upper limit value or a lower limit value described in a certain numerical range may be replaced with an upper limit value or a lower limit value in another numerical range described in a stepwise manner. Further, in a numerical range described in the present specification, an upper limit value or a lower limit value described in the numerical range may be replaced with a value shown in Examples.

In the present disclosure, the meaning of the term "step" includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present disclosure, each component may include a plurality of kinds of particles corresponding to each component. In a case where a plurality of kinds of particles corresponding to each component are present in a composition, the particle diameter of each component indicates the value of a mixture of the plurality of kinds of particles present in the composition, unless otherwise specified.

In the present disclosure, the term "(meth)acryl" may denote any of "acryl" or "methacryl".

In the present disclosure, an alkyl group may be any of linear, branched, or cyclic unless otherwise specified.

<Electrophotographic Photoreceptor>

The present disclosure provides a first exemplary embodiment and a second exemplary embodiment of an electrophotographic photoreceptor (hereinafter, also referred to as a "photoreceptor").

The photoreceptor according to the first exemplary embodiment includes a conductive substrate, and a lamination type photosensitive layer disposed on the conductive substrate and including a charge generation layer and a charge transport layer. The photoreceptor according to the first exemplary embodiment may further include other layers (for example, an undercoat layer and an interlayer).

The photoreceptor according to the second exemplary embodiment includes a conductive substrate, and a single layer type photosensitive layer disposed on the conductive substrate. The photoreceptor according to the second exemplary embodiment may further include other layers (for example, an undercoat layer and an interlayer).

FIG. 1 is a partial cross-sectional view schematically showing an example of the layer configuration of the photoreceptor according to the first exemplary embodiment. A photoreceptor 10A shown in FIG. 1 includes a lamination type photosensitive layer. The photoreceptor 10A has a structure in which an undercoat layer 2, a charge generation layer 3, and a charge transport layer 4 are laminated in this order on a conductive substrate 1, and the charge generation layer 3 and the charge transport layer 4 constitute a photosensitive layer 5 (so-called function separation type photosensitive layer). The photoreceptor 10A may include an interlayer (not shown) between the undercoat layer 2 and the charge generation layer 3.

Figure 2:
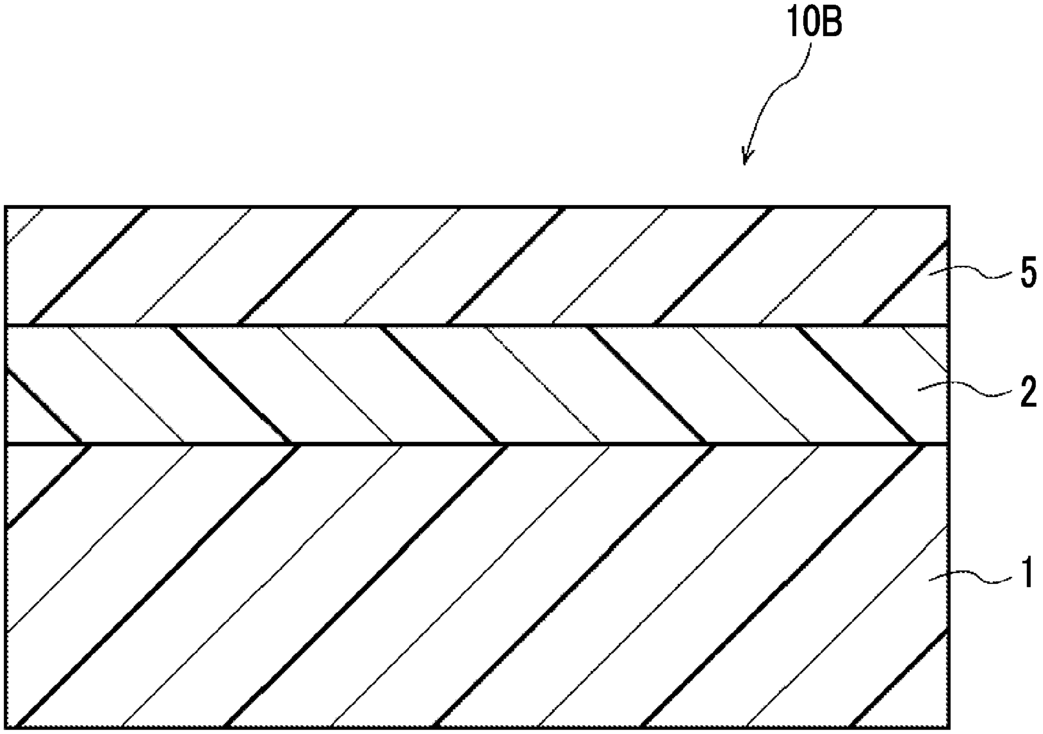
FIG. 2 is a partial cross-sectional view showing an example of a layer configuration of an electrophotographic photoreceptor according to a second exemplary embodiment.

FIG. 2 is a partial cross-sectional view schematically showing an example of the layer configuration of the photoreceptor according to the second exemplary embodiment. A photoreceptor 10B shown in FIG. 2 includes a single layer type photosensitive layer. The photoreceptor 10B has a structure in which the undercoat layer 2 and the photosensitive layer 5 are laminated in this order on the conductive substrate 1. The photoreceptor 10B may include an interlayer (not shown) between the undercoat layer 2 and the photosensitive layer 5.

The charge transport layer of the photoreceptor according to the first exemplary embodiment contains a polyester resin (1) having a dicarboxylic acid unit (A) represented by Formula (A) and a diol unit (B) represented by Formula (B), and a charge transport material, in a case where a value A is a weight-average molecular weight Mw of the polyester resin (1) contained in the charge transport layer divided by 10,000 (A=Mw/10,000), and a value of a ratio M1/M2 of a mass M1 of the charge transport material contained in the charge transport layer to a mass M2 of the charge transport layer is defined as Cs, and the average thickness of the charge transport layer is defined as Ds (μm), expressions of $5 \leq A \leq 40$, $0.28 \leq Cs \leq 0.55$, $27 \leq Ds \leq 50$, and $2.5 \leq (A \times Ds)/(Cs \times 100) \leq 70.0$ are satisfied.

The single layer type photosensitive layer of the photoreceptor according to the second exemplary embodiment contains a polyester resin (1) having a dicarboxylic acid unit (A) represented by Formula (A) and a diol unit (B) represented by Formula (B), and a charge transport material, and in a case where a value A is the weight-average molecular weight Mw of the polyester resin (1) contained in the single layer type photosensitive layer divided by 10,000 (A=Mw/10,000), and the value of the ratio M1/M2 of the mass M1 of the charge transport material contained in the single layer type photosensitive layer to the mass M2 of the single layer type photosensitive layer is defined as Ct, and the average thickness of the single layer type photosensitive layer is defined as Dt (μm), expressions of $5 \leq A \leq 40$, $0.40 \leq Ct \leq 0.60$, $27 \leq Dt \leq 50$, and $2.5 \leq (A \times Dt)/(Ct \times 100) \leq 48.0$ are satisfied.

Formula (A)

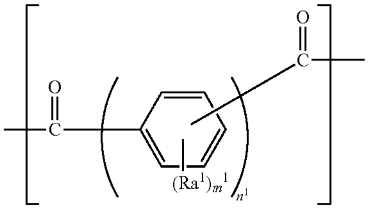

Formula (B)

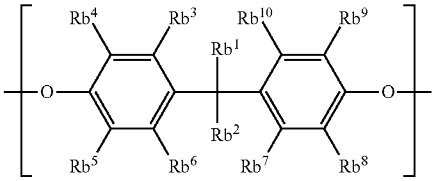

In Formula (A), $n^1$ represents 1, 2, or 3, $m^1$'s each independently represent 0, 1, 2, 3, or 4, $Ra^1$'s each independently represent an alkyl group having 1 or more and 10 or less carbon atoms, an aryl group having 6 or more and 12 or less carbon atoms, or an alkoxy group having 1 or more and 6 or less carbon atoms.

In Formula (B), $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, $Rb^3$, $Rb^4$, $Rb^5$, $Rb^6$, $Rb^7$, $Rb^8$, $Rb^9$, and $Rb^{10}$ each independently represent a hydrogen atom, an alkyl group having 1 or more and 10 or less carbon atoms, an aryl group having 6 or more and 12 or less carbon atoms, an aralkyl group having 7 or more and 20 or less carbon atoms, or an alkoxy group having 1 or more and 6 or less carbon atoms, and $Rb^1$ and $Rb^2$ may be bonded to each other to form a cyclic alkyl group.

Hereinafter, in a case of description common to the first exemplary embodiment and the second exemplary embodiment, both exemplary embodiments are collectively referred to as the present exemplary embodiment.

The photoreceptor according to the present exemplary embodiment has a photosensitive layer with excellent abrasion resistance as compared with a photoreceptor having a value of $(A \times Ds)/(Cs \times 100)$ of less than 2.5 or a photoreceptor having a value of $(A \times Dt)/(Ct \times 100)$ of less than 2.5, and the photoreceptor has excellent electrical characteristics and the photosensitive layer thereof is unlikely to be peeled off as compared with a photoreceptor having a value of (A×Ds)/(Cs×100) of greater than 70.0 or a photoreceptor having a value of (A×Dt)/(Ct×100) of greater than 48.0. The reason for this is assumed as follows.

As a technique for enhancing the abrasion resistance of the photosensitive layer, a technique of using a polyester resin having a rigid skeleton with repeating aromatic rings as a binder resin for a photosensitive layer has been known. However, in a case where a polyester resin having a rigid skeleton with repeating aromatic rings is used as the binder resin of the photosensitive layer, the dispersibility of the charge transport material tends to be degraded, and as a result, the electrical characteristics of the photoreceptor do not satisfy the expected value in some cases. Further, in the case where a polyester resin having a rigid skeleton with repeating aromatic rings is used as a binder resin of the photosensitive layer, the photosensitive layer may be hard or the adhesiveness of the photosensitive layer with another layer may be degraded, and thus the photosensitive layer may be peeled off in some cases.

In this regard, the inventors of the present invention find that the electrical characteristics of the photoreceptor can be excellent, and peeling of the photosensitive layer can be suppressed by enhancing the abrasion resistance of the photosensitive layer using the polyester resin (1) as a binder resin of the photosensitive layer and setting the value of (A×Ds)/(Cs×100) to 2.5 or greater and 70.0 or less or the value of (A×Dt)/(Ct×100) to 2.5 or greater and 48.0 or less.

In a case where the value of (A×Ds)/(Cs×100) or (A×Dt)/(Ct×100) is less than 2.5, since the weight-average molecular weight Mw of the polyester resin (1), the average thickness Ds of the charge transport layer, or the average thickness Dt value of the single layer type photosensitive layer is extremely small or the value of the content ratio Cs or Ct of the charge transport material is extremely large (that is, the content ratio of the polyester resin (1) is extremely small), the abrasion resistance of the photosensitive layer is insufficient. From this viewpoint, the value of (A×Ds)/(Cs×100) and the value of (A×Dt)/(Ct×100) are each 2.5 or greater, for example, preferably 3.6 or greater, more preferably 7.2 or greater, and still more preferably 7.7 or greater.

In a case where the value of (A×Ds)/(Cs×100) is greater than 70.0 or the value of (A×Dt)/(Ct×100) is greater than 48.0, since the weight-average molecular weight Mw of the polyester resin (1), the average thickness Ds of the charge transport layer, or the average thickness Dt value of the single layer type photosensitive layer is extremely large or the value of the content ratio Cs or Ct of the charge transport material is extremely small (that is, the content ratio of the polyester resin (1) is extremely large), the photosensitive layer may be peeled off. From this viewpoint, the value of (A×Ds)/(Cs×100) is 70.0 or less, for example, preferably 46.0 or less, more preferably 33.0 or less, and still more preferably 25.0 or less. From this viewpoint, the value of (A×Dt)/(Ct×100) is 48.0 or less, for example, preferably 40.0 or less, more preferably 27.0 or less, and still more preferably 20.0 or less.

In a case where a value A is the weight-average molecular weight Mw divided by 10,000 (A=Mw/10,000), the value of A of the polyester resin (1) contained in the charge transport layer according to the first exemplary embodiment and the value of A of the polyester resin (1) contained in the single layer type photosensitive layer according to the second exemplary embodiment are each 5 or greater and 40 or less. That is, the weight-average molecular weight Mw of the polyester resin (1) is 50,000 or greater and 400,000 or less.

In a case where the value of A is less than 5, the strength of the charge transport layer or the single layer type photosensitive layer is decreased. From this viewpoint, the value of A is 5 or greater, for example, preferably 6 or greater, more preferably 7 or greater, and still more preferably 8 or greater.

In a case where the value of A is greater than 40, the viscosity of a coating solution for forming the charge transport layer or the single layer type photosensitive layer increases, and stable coating is unlikely to occur. In addition, the adhesiveness of the charge transport layer or the single layer type photosensitive layer to other layers is degraded, and thus the charge transport layer or the single layer type photosensitive layer is easily peeled off. From this viewpoint, the value of A is 40 or less, for example, preferably 30 or less, more preferably 25 or less, and still more preferably 20 or less.

In the charge transport layer according to the first exemplary embodiment, the value Cs of the ratio M1/M2 of the mass M1 of the charge transport material contained in the layer to the mass M2 of the layer satisfies an expression of $0.28 \leq Cs \leq 0.55$.

In the single layer type photosensitive layer according to the second exemplary embodiment, the value Ct of the ratio M1/M2 of the mass M1 of the charge transport material contained in the layer to the mass M2 of the layer satisfies an expression of $0.40 \leq Ct \leq 0.60$.

In a case where the value of Cs is less than 0.28 or the value of Ct is less than 0.40, the content ratio of the charge transport material contained in the charge transport layer or the single layer type photosensitive layer is small, and thus the electrical characteristics are degraded. From this viewpoint, the value of Cs is 0.28 or greater, for example, preferably 0.31 or greater, more preferably 0.33 or greater, and still more preferably 0.34 or greater. From this viewpoint, the value of Ct is 0.40 or greater, for example, preferably 0.43 or greater, more preferably 0.44 or greater, and still more preferably 0.45 or greater.

In a case where the value of Cs is greater than 0.55 or the value of Ct is greater than 0.60, since the content ratio of the charge transport material contained in the charge transport layer or the single layer type photosensitive layer is extremely large (that is, the content ratio of the polyester resin (1) is extremely small), the strength of the charge transport layer or the single layer type photosensitive layer is decreased, and the abrasion resistance is degraded. From this viewpoint, the value of Cs is 0.55 or less, for example, preferably 0.50 or less, more preferably 0.48 or less, and still more preferably 0.46 or less. From this viewpoint, the value of Ct is 0.60 or less, for example, preferably 0.58 or less, more preferably 0.56 or less, and still more preferably 0.55 or less.

In a preferred exemplary embodiment of the photoreceptor according to the first exemplary embodiment, in a case where a value of a ratio Mw/Mn of the weight-average molecular weight Mw and the number average molecular weight Mn of the polyester resin (1) contained in the charge transport layer is defined as B and the value of the ratio M1/M2 of the mass M1 of the charge transport material contained in the charge transport layer to the mass M2 of the charge transport layer is defined as Cs, expressions of $2.1 \leq B \leq 4.0$ and $0.60 \leq (B \times Cs) \leq 2.10$ are satisfied.

In a preferred exemplary embodiment of the photoreceptor according to the second exemplary embodiment, in a case where the value of the ratio Mw/Mn of the weight-average molecular weight Mw and the number average molecular weight Mn of the polyester resin (1) contained in the single layer type photosensitive layer is defined as B and the value of the ratio M1/M2 of the mass M1 of the charge transport material contained in the single layer type photosensitive layer to the mass M2 of the single layer type photosensitive layer is defined as Ct, expressions of $2.1 \leq B \leq 4.0$ and $0.90 \leq (B \times Ct) \leq 2.30$ are satisfied.

It is assumed that in a case where the value of (B×Cs) is less than 0.60 or the value of (B×Ct) is less than 0.90, the dispersion uniformity of the charge transport material contained in the charge transport layer or the single layer type photosensitive layer is decreased because the dispersity Mw/Mn of the molecular weight of the polyester resin (1) is extremely small (the proportion of low-molecular-weight components in the resin is small), or the electrical characteristics are degraded because the value of the content ratio Cs or Ct of the charge transport material is extremely small. From this viewpoint, the value of (B×Cs) is, for example, preferably 0.60 or greater, more preferably 0.70 or greater, still more preferably 0.80 or greater, and even still more preferably 0.90 or greater. From this viewpoint, the value of (B×Ct) is, for example, preferably 0.90 or greater, more preferably 1.00 or greater, still more preferably 1.10 or greater, and even still more preferably 1.20 or more.

It is assumed that in a case where the value of (B×Cs) is greater than 2.10 or the value of (B×Ct) is greater than 2.30, the strength of the charge transport layer or the single layer type photosensitive layer is decreased and the abrasion resistance is degraded because the dispersity Mw/Mn of the molecular weight of the polyester resin (1) is extremely large (the proportion of low-molecular-weight components in the resin is great) or the value of the content ratio Cs or Ct of the charge transport material is extremely large (the content ratio of the polyester resin (1) is extremely small). From this viewpoint, the value of (B×Cs) is, for example, preferably 2.10 or less, more preferably 1.90 or less, still more preferably 1.70 or less, and even still more preferably 1.50 or less. From this viewpoint, the value of (B×Ct) is, for example, preferably 2.30 or less, more preferably 2.20 or less, still more preferably 2.10 or less, and even still more preferably 2.00 or less.

It is preferable that, for example, a value B of the ratio Mw/Mn of the weight-average molecular weight Mw to the number average molecular weight Mn of each of the polyester resin (1) contained in the charge transport layer according to the first exemplary embodiment and the polyester resin (1) contained in the single layer type photosensitive layer according to the second exemplary embodiment satisfies an expression of $2.1 \leq B \leq 4.0$.

In a case where the value B is 2.1 or greater, the ratio Mw/Mn is not extremely small (the proportion of the low-molecular-weight components in the polyester resin (1) is not extremely small), and thus the dispersion uniformity of the charge transport material contained in the charge transport layer or the single layer type photosensitive layer is enhanced. From this viewpoint, the value B is, for example, preferably 2.1 or greater, more preferably 2.3 or greater, still more preferably 2.4 or greater, and even still more preferably 2.5 or greater.

In a case where the value B is 4.0 or less, the ratio Mw/Mn is not extremely large (the proportion of the low-molecular-weight components in the polyester resin (1) is not extremely large), and thus the strength of the charge transport layer or the single layer type photosensitive layer is appropriate and the abrasion resistance of the photosensitive layer is enhanced. From this viewpoint, the value B is, for example, preferably 4.0 or less, more preferably 3.8 or less, still more preferably 3.7 or less, and even still more preferably 3.6 or less.

The value B of the ratio Mw/Mn of the polyester resin (1) can be controlled by adjusting, for example, the polymerization conditions (the solvent composition, the concentration, the temperature, the stirring rate, and the amount of a polymerization catalyst) or the purification conditions (the solvent composition and the concentration during reprecipitation). For example, the reaction rate can be made non-uniform and the value B of the ratio Mw/Mn can be increased by adjusting the solvent composition or the concentration during the polymerization such that the solubility of the monomer and the polymer is increased or by reducing the stirring rate. Further, the reaction rate can be made uniform by a method opposite to the method described above, and the value B of the ratio Mw/Mn can be decreased by sufficiently removing components inactivating the reaction activity, such as water, before the polymerization and performing the polymerization. Further, the value B of the ratio Mw/Mn can be decreased by carrying out reprecipitation with the solvent composition in which a difference in the solubility between high-molecular-weight components and low-molecular-weight components is large during the purification.

In the first exemplary embodiment, the method of measuring the weight-average molecular weight Mw and the number average molecular weight Mn of the polyester resin (1) contained in the charge transport layer is as follows.

The photoreceptor is immersed in various solvents (mixed solvents may be used), and the solvent in which the charge transport layer is dissolved is grasped. The photoreceptor is immersed in a solvent in which the charge transport layer is dissolved to extract the charge transport layer. The solution from which the charge transport layer is added dropwise to a poor solvent of the polyester resin (1) (for example, a non-polar solvent such as hexane or toluene, or lower alcohol such as methanol or isopropanol, and a mixed solvent may be used as a poor solvent) to reprecipitate the resin. The reprecipitation treatment is repeated twice as necessary, and the resin which is a reprecipitate is vacuum-dried, thereby obtaining the polyester resin (1). The molecular weight of the polyester resin (1) is measured by gel permeation chromatography (GPC) described below, and the Mw and the Mn are specified.

In the second exemplary embodiment, the measurement is performed similarly by replacing "charge transport layer" with "single layer type photosensitive layer".

In the first exemplary embodiment, the method of measuring the mass M1 of the charge transport material contained in the charge transport layer and the mass M2 of the charge transport layer is as follows.

The solution from which the charge transport layer is extracted is concentrated, vacuum-dried, and weighed, thereby obtaining the mass M2 of the charge transport layer.

The solution remaining after the above-described reprecipitation treatment is concentrated, each material is isolated by preparative thin layer chromatography, and the yield is quantified. The charge transport materials are specified from each material isolated by nuclear magnetic resonance (NMR) measurement, and the yields of the charge transport materials are summed to obtain the mass M1.

In the second exemplary embodiment, the measurement is performed similarly by replacing "charge transport layer" with "single layer type photosensitive layer".

The average thickness Ds of the charge transport layer in the first exemplary embodiment and the average thickness Dt of the single layer type photosensitive layer in the second exemplary embodiment are 27 μm or greater and 50 μm or less.

In a case where the average thickness Ds and the average thickness Dt are 27 μm or greater, the abrasion allowance of the photoreceptor can be ensured and the life of the photoreceptor can be extended. From this viewpoint, the average thickness Ds and the average thickness Dt are 27 μm or greater, for example, preferably 31 μm or greater, more preferably 35 μm or greater, and still more preferably 37 μm or greater.

In a case where the average thickness Ds and the average thickness Dt are 50 μm or less, the electrical characteristics at both the initial stage and after the abrasion are maintained, and the peeling of the photosensitive layer can be suppressed. From this viewpoint, the average thickness Ds and the average thickness Dt are 50 μm or less, for example, preferably 48 μm or less, more preferably 46 μm or less, and still more preferably 45 μm or less.

In the first exemplary embodiment, the average thickness Ds of the charge transport layer is a value obtained by measuring the layer thicknesses at a total of 40 sites, 10 sites evenly divided in the axial direction and 4 equal parts (cut every 90°) in the circumferential direction of the photoreceptor, using an eddy current film thickness meter and arithmetically averaging the obtained thicknesses.

In the second exemplary embodiment, the average thickness Dt of the single layer type photosensitive layer is acquired similarly by replacing "charge transport layer" with "single layer type photosensitive layer".

Hereinafter, the polyester resin (1) and each layer of the photoreceptor will be described in detail.

[Polyester Resin (1)]

The polyester resin (1) has at least a dicarboxylic acid unit (A) represented by Formula (A) and a diol unit (B) represented by Formula (B). The polyester resin (1) may have other dicarboxylic acid units in addition to the dicarboxylic acid unit (A). The polyester resin (1) may have other diol units in addition to the diol unit (B).

The dicarboxylic acid unit (A) is a constitutional unit represented by Formula (A).

Formula (A)

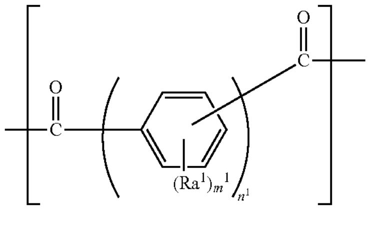

In Formula (A), $n^1$ represents 1, 2, or 3, $m^1$'s each independently represent 0, 1, 2, 3, or 4, $Ra^1$'s each independently represent an alkyl group having 1 or more and 10 or less carbon atoms, an aryl group having 6 or more and 12 or less carbon atoms, or an alkoxy group having 1 or more and 6 or less carbon atoms.

In Formula (A), $n^1$ represents 1, 2, or 3 and, for example, preferably 2.

In a case where $n^1$ represents 2, two benzene rings in Formula (A) may be benzene rings that are the same as or different from each other for $m^1$ and $Ra^1$.

In a case where $n^1$ represents 3, three benzene rings in Formula (A) may be benzene rings that are the same as or different from each other for $m^1$ and $Ra^1$.

In a case where $n^1$ in Formula (A) represents 2 or 3, the linking position between the benzene rings may be any of an ortho position, a meta position, or a para position and, for example, preferably a meta position or a para position.

In Formula (A), $m^1$ represents 0, 1, 2, 3 or 4, for example, preferably 0, 1, or 2, more preferably 0 or 1, and still more preferably 0.

In a case where $m^1$ represents 2, two $Ra^1$'s bonded to the identical benzene ring may be the same as or different from each other.

In a case where $m^1$ represents 3, three $Ra^1$'s bonded to the identical benzene ring may be of the same as or different from each other.

In a case where $m^1$ represents 4, four $Ra^1$'s bonded to the identical benzene ring may be of the same as or different from each other.

In Formula (A), the alkyl group having 1 or more and 10 or less carbon atoms may be linear, branched, or cyclic. The number of carbon atoms of the alkyl group is, for example, preferably 1 or more and 6 or less, more preferably 1 or more and 4 or less, and still more preferably 1 or 2.

In Formula (A), the aryl group having 6 or more and 12 or less carbon atoms may be any of monocyclic or polycyclic. The number of carbon atoms of the aryl group is, for example, preferably 6 or more and 10 or less and more preferably 6 or more and 9 or less.

In Formula (A), the alkyl group in the alkoxy group having 1 or more and 6 or less carbon atoms may be linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

In Formula (A), examples of the linear alkyl group having 1 or more and 10 or less carbon atoms include a methyl group, an ethyl group, an n-propyl group, an n-butyl group, an n-pentyl group, an n-hexyl group, an n-heptyl group, an n-octyl group, an n-nonyl group, and an n-decyl group.

Examples of the branched alkyl group having 3 or more and 10 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

Examples of the cyclic alkyl group having 3 or more and 10 or less carbon atoms include a cyclopropyl group, a cyclobutyl group, a cyclopentyl group, a cyclohexyl group, a cycloheptyl group, a cyclooctyl group, a cyclononyl group, a cyclodecyl group, and polycyclic (for example, bicyclic, tricyclic, or spirocyclic) alkyl groups to which these monocyclic alkyl groups are linked.

In Formula (A), examples of the aryl group having 6 or more and 12 or less carbon atoms include a phenyl group, a biphenyl group, a 1-naphthyl group, and a 2-naphthyl group.

In Formula (A), examples of the linear alkoxy group having 1 or more and 6 or less carbon atoms include a methoxy group, an ethoxy group, an n-propoxy group, an n-butoxy group, an n-pentyloxy group, and an n-hexyloxy group.

In Formula (A), examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

In Formula (A), examples of the cyclic alkoxy group having 3 or more and 6 or less carbon atoms include a cyclopropoxy group, a cyclobutoxy group, a cyclopentyloxy group, and a cyclohexyloxy group.

In a case where $m^1$ represents 1, 2, 3, or 4 in Formula (A), $Ra^1$ represents, for example, preferably a linear alkyl group having 1 or more and 6 or less carbon atoms or a branched alkyl group having 3 or more and 6 or less carbon atoms, more preferably a linear alkyl group having 1 or more and 4 or less carbon atoms or a branched alkyl group having 3 or 4 carbon atoms, and still more preferably a methyl group or an ethyl group.

Hereinafter, dicarboxylic acid units (A-1) to (A-13) are shown as specific examples of the dicarboxylic acid unit (A). The dicarboxylic acid unit (A) is not limited thereto.

(A-1)

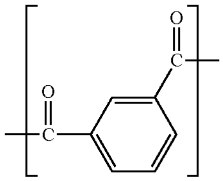

(A-2)

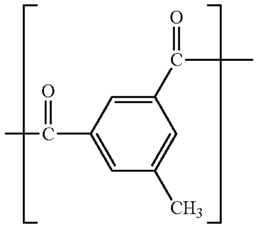

(A-3)

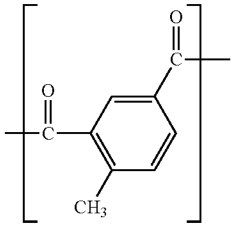

(A-4)

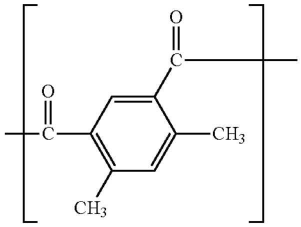

(A-5)

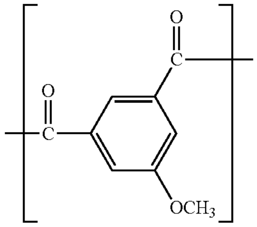

-continued (A-6)

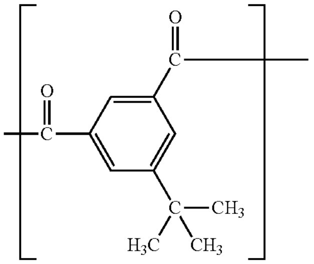

(A-7)

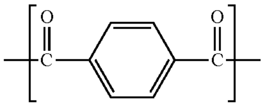

(A-8)

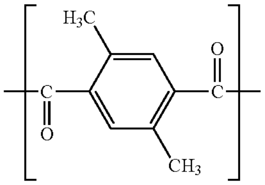

(A-9)

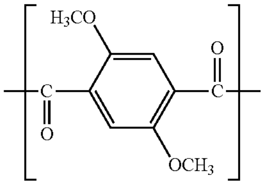

(A-10)

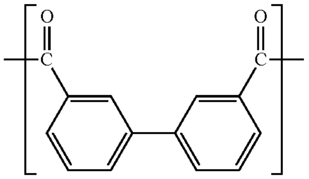

(A-11

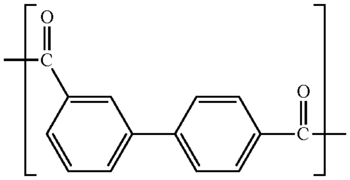

(A-12)

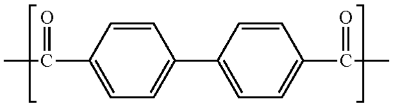

(A-13)

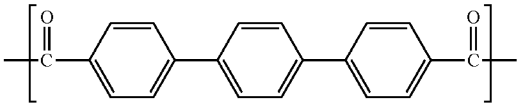

As the dicarboxylic acid unit (A), for example, (A-1), (A-7), and (A-12) in the specific examples shown above are preferable, and (A-12) is most preferable.

The dicarboxylic acid unit (A) contained in the polyester resin (1) may be used alone or in combination of two or more kinds thereof.

The diol unit (B) is a constitutional unit represented by Formula (B).

Formula (B)

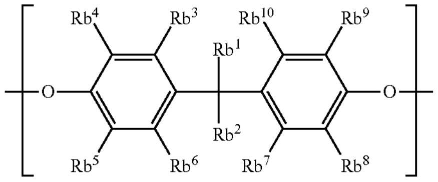

In Formula (B), $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, $Rb^3$, $Rb^4$, $Rb^5$, $Rb^6$, $Rb^7$, $Rb^8$, $Rb^9$, and $Rb^{10}$ each independently represent a hydrogen atom, an alkyl group having 1 or more and 10 or less carbon atoms, an aryl group having 6 or more and 12 or less carbon atoms, an aralkyl group having 7 or more and 20 or less carbon atoms, or an alkoxy group having 1 or more and 6 or less carbon atoms, and $Rb^1$ and $Rb^2$ may be bonded to each other to form a cyclic alkyl group.

In Formula (B), the alkyl group having 1 or more and 20 or less carbon atoms as $Rb^1$ and $Rb^2$ may be linear, branched, or cyclic. The number of carbon atoms of the alkyl group is, for example, preferably 1 or more and 15 or less, more preferably 1 or more and 12 or less, and still more preferably 1 or more and 10 or less.

In Formula (B), the aryl group having 6 or more and 12 or less carbon atoms as $Rb^1$ and $Rb^2$ may be any of monocyclic or polycyclic. The number of carbon atoms of the aryl group is, for example, preferably 6 or more and 10 or less and more preferably 6 or more and 9 or less.

In Formula (B), the aryl group in the aralkyl group having 7 or more and 20 or less carbon atoms as $Rb^1$ and $Rb^2$ may be any of monocyclic or polycyclic, and the alkyl group in the aralkyl group having 7 or more and 20 or less carbon atoms may be any of linear, branched, or cyclic. The number of carbon atoms of the aryl group is, for example, preferably 6 or more and 10 or less and more preferably 6 or more and 9 or less. The number of carbon atoms of the alkyl group is, for example, preferably 1 or more and 6 or less, more preferably 1 or more and 5 or less, and still more preferably 1 or more and 4 or less.

In Formula (B), the number of carbon atoms of the cyclic alkyl group that may be formed by Rb1 and Rb2 being bonded to each other is, for example, preferably 5 or more and 15 or less and more preferably 6 or more and 12 or less.

In Formula (B), the alkyl group having 1 or more and 10 or less carbon atoms as $Rb^3$, $Rb^4$, $Rb^5$, $Rb^6$, $Rb^7$, $Rb^8$, $Rb^9$, and $Rb^{10}$ may be linear, branched, or cyclic. The number of carbon atoms of the alkyl group is, for example, preferably 1 or more and 6 or less, more preferably 1 or more and 4 or less, and still more preferably 1 or 2.

In Formula (B), the aryl group having 6 or more and 12 or less carbon atoms as $Rb^3$, $Rb^4$, $Rb^5$, $Rb^6$, $Rb^7$, $Rb^8$, $Rb^9$, and $Rb^{10}$ may be monocyclic or polycyclic. The number of carbon atoms of the aryl group is, for example, preferably 6 or more and 10 or less and more preferably 6 or more and 9 or less.

In Formula (B), the aryl group in the aralkyl group having 7 or more and 20 or less carbon atoms as $Rb^3$, $Rb^4$, $Rb^5$, $Rb^6$, $Rb^7$, $Rb^8$, $Rb^9$, and $Rb^{10}$ may be any of monocyclic or polycyclic, and the alkyl group in the aralkyl group having 7 or more and 20 or less carbon atoms may be linear, branched, or cyclic. The number of carbon atoms of the aryl group is, for example, preferably 6 or more and 10 or less and more preferably 6 or more and 9 or less. The number of carbon atoms of the alkyl group is, for example, preferably 1 or more and 6 or less, more preferably 1 or more and 5 or less, and still more preferably 1 or more and 4 or less.

In Formula (B), the alkyl group in the alkoxy group having 1 or more and 6 or less carbon atoms as $Rb^3$, $Rb^4$, $Rb^5$, $Rb^6$, $Rb^7$, $Rb^8$, $Rb^9$, and $Rb^{10}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

In Formula (B), examples of the linear alkyl group having 1 or more and 20 or less carbon atoms include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, a tridecyl group, an n-tetradecyl group, an n-pentadecyl group, an n-heptadecyl group, an n-octadecyl group, an n-nonadecyl group, and an n-icosyl group.

Examples of the branched alkyl group having 3 or more and 20 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isododecyl group, a sec-dodecyl group, a tert-dodecyl group, a tert-tetradecyl group, and a tert-pentadecyl group.

Examples of the cyclic alkyl group having 3 or more and 20 or less carbon atoms include a cyclopropyl group, a cyclobutyl group, a cyclopentyl group, a cyclohexyl group, a cycloheptyl group, a cyclooctyl group, a cyclononyl group, a cyclodecyl group, and polycyclic (for example, bicyclic, tricyclic, or spirocyclic) alkyl groups to which these monocyclic alkyl groups are linked.

In Formula (B), examples of the aryl group having 6 or more and 12 or less carbon atoms include a phenyl group, a biphenyl group, a 1-naphthyl group, and a 2-naphthyl group.

In Formula (B), examples of the aralkyl group having 7 or more and 20 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, and a phenyl-cyclopentylmethyl group.

In Formula (B), examples of the linear alkoxy group having 1 or more and 6 or less carbon atoms include a methoxy group, an ethoxy group, an n-propoxy group, an n-butoxy group, an n-pentyloxy group, and an n-hexyloxy group.

In Formula (B), examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

In Formula (B), examples of the cyclic alkoxy group having 3 or more and 6 or less carbon atoms include a cyclopropoxy group, a cyclobutoxy group, a cyclopentyloxy group, and a cyclohexyloxy group.

In Formula (B), for example, it is preferable that $Rb^1$ and $Rb^2$ each independently represent a hydrogen atom, a linear alkyl group having 1 or more and 12 or less carbon atoms, a branched alkyl group having 1 or more and 12 or less carbon atoms, an aryl group having 6 or more and 10 or less carbon atoms, or an aralkyl group having 7 or more and 10 or less carbon atoms or $Rb^1$ and $Rb^2$ are bonded to each other to form a cyclic alkyl group having 5 or more and 12 or less carbon atoms.

In Formula (B), for example, it is more preferable that $Rb^1$ and $Rb^2$ each independently represent a hydrogen atom, a linear alkyl group having 1 or more and 10 or less carbon atoms or a branched alkyl group having 1 or more and 10 or less carbon atoms or $Rb^1$ and $Rb^2$ are bonded to each other to form a cyclic alkyl group having 5 or more and 12 or less carbon atoms.

In Formula (B), for example, it is still more preferable that $Rb^1$ and $Rb^2$ each independently represent a hydrogen atom, a linear alkyl group having 1 or more and 10 or less carbon atoms, or a branched alkyl group having 1 or more and 10 or less carbon atoms.

In Formula (B), for example, it is preferable that at least one of $Rb^1$ or $Rb^2$ represents a linear alkyl group having 4 or more and 10 or less carbon atoms, a branched alkyl group having 4 or more and 10 or less carbon atoms, an aryl group having 6 or more and 10 or less carbon atoms, or an aralkyl group having 7 or more and 10 or less carbon atoms or $Rb^1$ and $Rb^2$ are bonded to each other to form a cyclic alkyl group having 5 or more and 12 or less carbon atoms.

In Formula (B), for example, it is more preferable that at least one of $Rb^1$ or $Rb^2$ represents a linear alkyl group having 4 or more and 10 or less carbon atoms or a branched alkyl group having 4 or more and 10 or less carbon atoms.

In a case where at least one of $Rb^1$ or $Rb^2$ is as described above, it is preferable that the other of $Rb^1$ or $Rb^2$ represents, for example, a hydrogen atom or a linear alkyl group having 1 or more and 3 or less carbon atoms.

It is preferable that the diol unit (B) is, for example, a constitutional unit represented by Formula (B').

Formula (B')

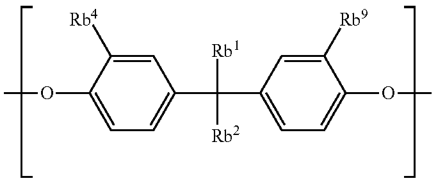

$Rb^1$, $Rb^2$, $Rb^4$, and $Rb^9$ in Formula (B') each have the same definition as that for $Rb^1$, $Rb^2$, $Rb^4$, and $Rb^9$ in Formula (B), and the preferable aspects thereof are the same as described above.

As the diol unit (B) in Formula (B'), for example, an aspect in which $Rb^1$ represents a hydrogen atom, a linear alkyl group having 1 or more and 3 or less carbon atoms, or a branched alkyl group having 3 carbon atoms, $Rb^2$ represents a linear alkyl group having 4 or more and 10 or less carbon atoms, a branched alkyl group having 4 or more and 10 or less carbon atoms, an aryl group having 6 or more and 10 or less carbon atoms, or an aralkyl group having 7 or more and 10 or less carbon atoms, and $Rb^4$ and $Rb^9$ each independently represent a hydrogen atom or a methyl group is preferable, and an aspect in which $Rb^1$ represents a hydrogen atom or a methyl group, $Rb^2$ represents a linear alkyl group having 4 or more and 10 or less carbon atoms, or a branched alkyl group having 4 or more and 10 or less carbon atoms, and $Rb^4$ and $Rb^9$ each independently represent a hydrogen atom or a methyl group is more preferable.

Hereinafter, diol units (B-1) to (B-38) are shown as specific examples of the diol unit (B). The diol unit (B) is not limited thereto.

(B-1)

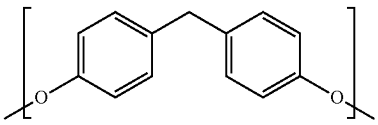

(B-2)

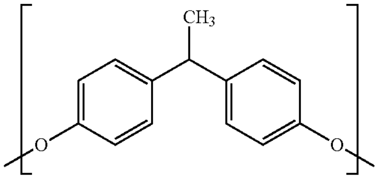

(B-3)

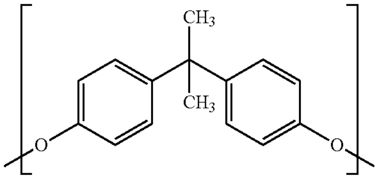

(B-4)

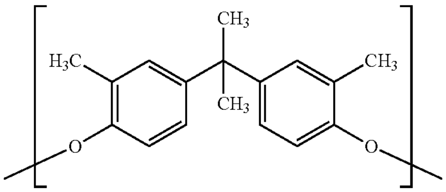

(B-5)

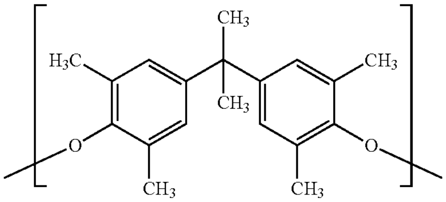

(B-6)

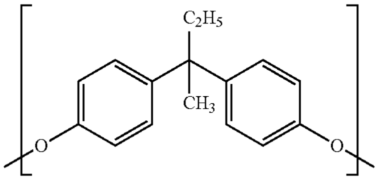

(B-7)

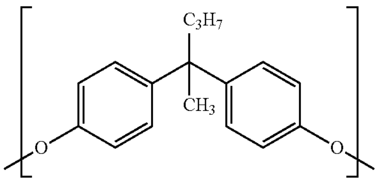

-continued
(B-8)
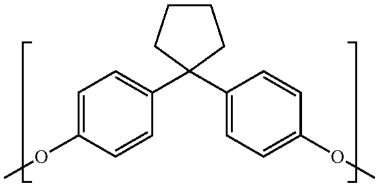
(B-9)
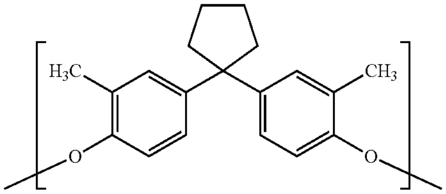
(B-10)
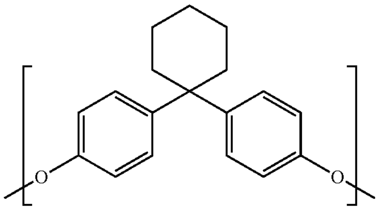
(B-11)
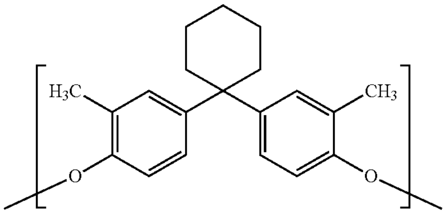
(B-12)
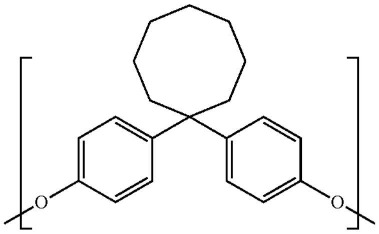
(B-13)
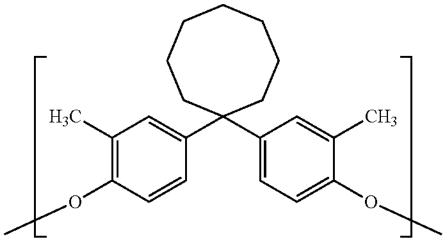
(B-14)
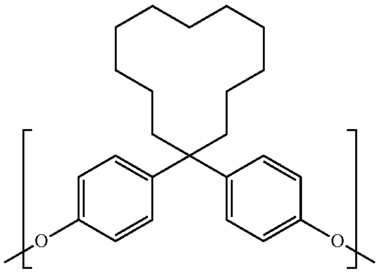
-continued
(B-15)
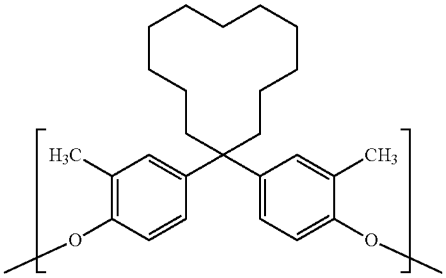
(B-16)
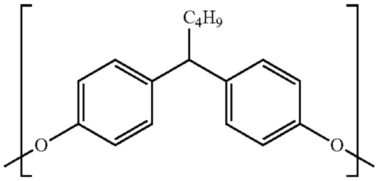
(B-17)
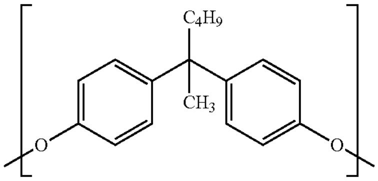
(B-18)
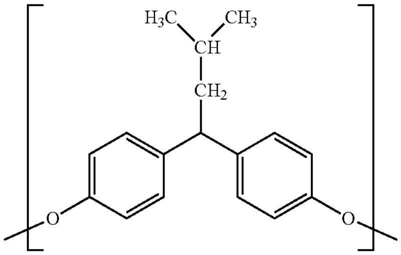
(B-19)
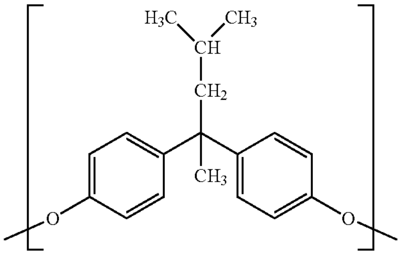
(B-20)
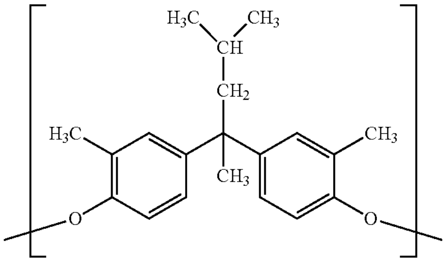

-continued
(B-21)
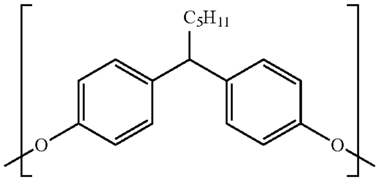
(B-22)
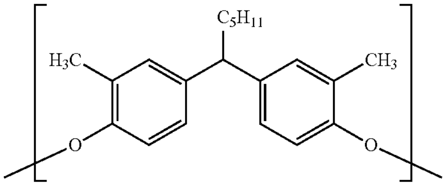
(B-23)
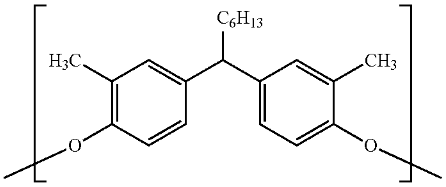
(B-24)
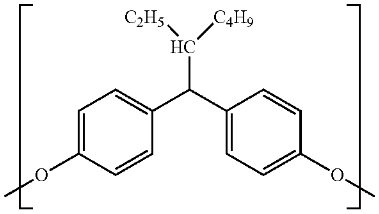
(B-25)
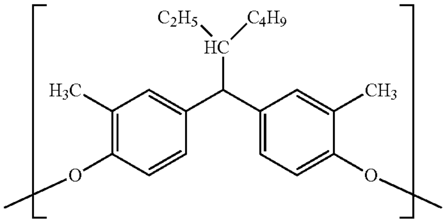
(B-26)
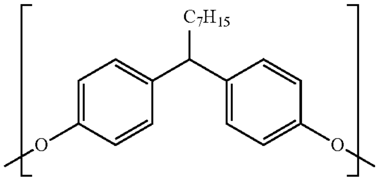
(B-27)
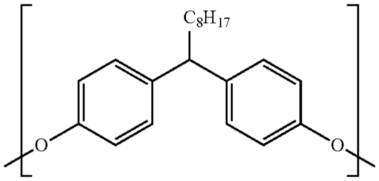
-continued
(B-28)
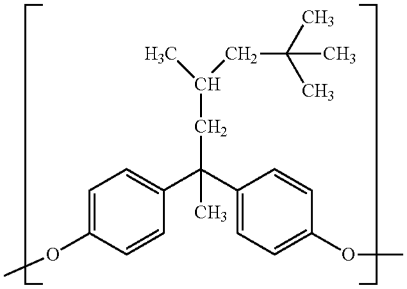
(B-29)
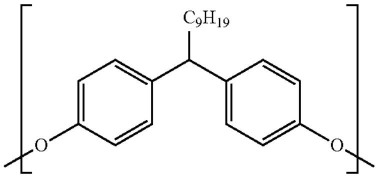
(B-30)
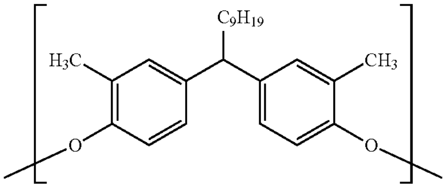
(B-31)
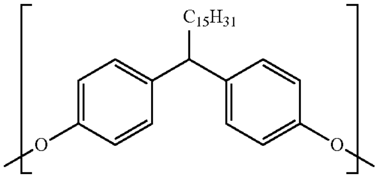
(B-32)
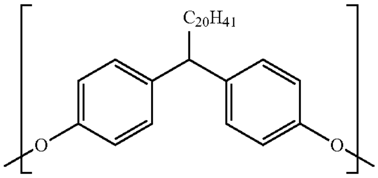
(B-33)
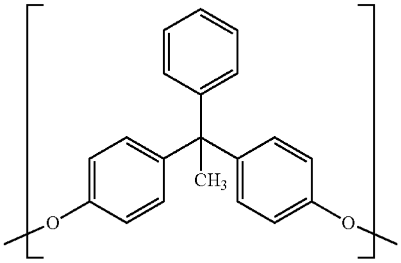
(B-34)
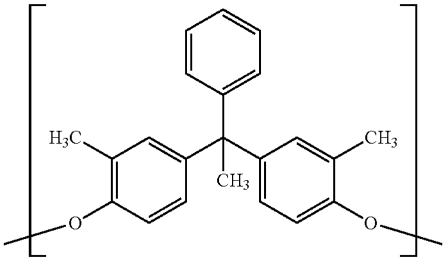

-continued (B-35)

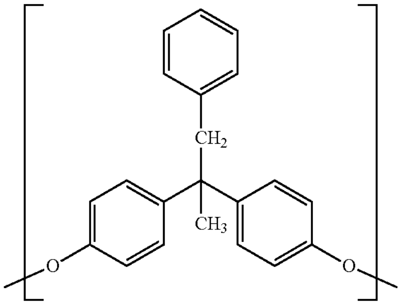

(B-36)

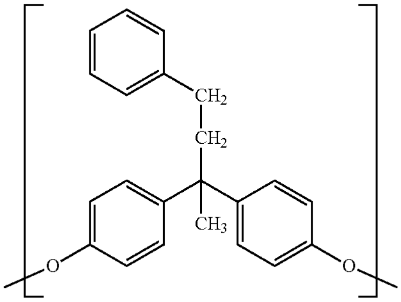

(B-37)

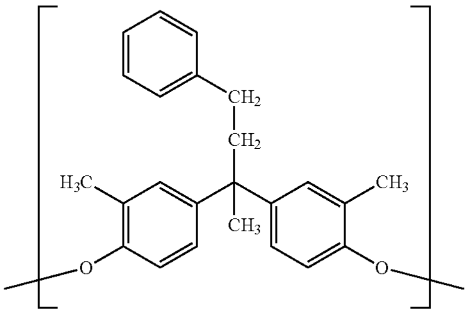

(B-38)

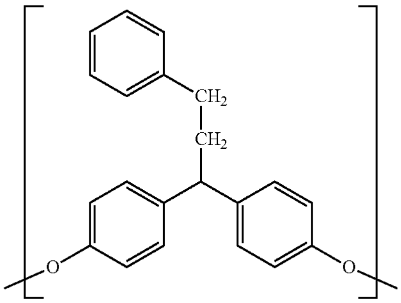

The diol unit (B) contained in the polyester resin (1) may be used alone or in combination of two or more kinds thereof.

The mass proportion of the dicarboxylic acid unit (A) in the polyester resin (1) is, for example, preferably 15% by mass or greater and 60% by mass or less.

In a case where the mass proportion of the dicarboxylic acid unit (A) is 15% by mass or greater, the abrasion resistance of the photosensitive layer is enhanced. From this viewpoint, the mass proportion of the dicarboxylic acid unit (A) is, for example, more preferably 20% by mass or greater and still more preferably 25% by mass or greater.

In a case where the mass proportion of the dicarboxylic acid unit (A) is 60% by mass or less, peeling of the photosensitive layer can be further suppressed. From this viewpoint, the mass proportion of the dicarboxylic acid unit (A) is, for example, more preferably 55% by mass or less and still more preferably 50% by mass or less.

The mass proportion of the diol unit (B) in the polyester resin (1) is, for example, preferably 25% by mass or greater and 60% by mass or less.

In a case where the mass proportion of the diol unit (B) is 25% by mass or greater, peeling of the photosensitive layer can be further suppressed. From this viewpoint, the mass proportion of the diol unit (B) is, for example, more preferably 30% by mass or greater and still more preferably 35% by mass or greater.

In a case where the mass proportion of the diol unit (B) is 60% by mass or less, the solubility in a coating solution for forming the photosensitive layer is maintained, and thus the abrasion resistance can be improved. From this viewpoint, the mass proportion of the diol unit (B) is, for example, more preferably 55% by mass or less and still more preferably 50% by mass or less.

The polyester resin (1) may have other dicarboxylic acid units in addition to the dicarboxylic acid unit (A).

Examples of other dicarboxylic acid units include a dicarboxylic acid unit (C) represented by Formula (C).

Formula (C')

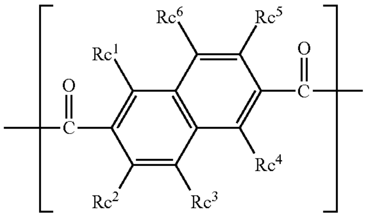

In Formula (C), $Rc^1$, $Rc^2$, $Rc^3$, $Rc^4$, $Rc^5$, and $Rc^6$ each independently represent a hydrogen atom, an alkyl group having 1 or greater and 10 or less carbon atoms, an aryl group having 6 or more and 12 or less carbon atoms, or an alkoxy group having 1 or more and 6 or less carbon atoms.

In Formula (C), the alkyl group having 1 or more and 10 or less carbon atoms may be linear, branched, or cyclic. The number of carbon atoms of the alkyl group is, for example, preferably 1 or more and 6 or less, more preferably 1 or more and 4 or less, and still more preferably 1 or 2.

In Formula (C), the aryl group having 6 or more and 12 or less carbon atoms may be any of monocyclic or polycyclic. The number of carbon atoms of the aryl group is, for example, preferably 6 or more and 10 or less and more preferably 6 or more and 9 or less.

In Formula (C), the alkyl group in the alkoxy group having 1 or more and 6 or less carbon atoms may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the respective aspects of the alkyl group, the aryl group, and the alkoxy group in Formula (C) include the same groups as the groups described in Formula (A).

In Formula (C), $Rc^1$, $Rc^2$, $Rc^3$, $Rc^4$, $Rc^5$, and $Rc^6$ each independently represent, for example, preferably a hydrogen atom, a linear alkyl group having 1 or more and 6 or less carbon atoms, or a branched alkyl group having 1 or more and 6 or less carbon atoms, more preferably a hydrogen atom, a linear alkyl group having 1 or more and 4 or less carbon atoms, or a branched alkyl group having 1 or more and 4 or less carbon atoms, still more preferably a hydrogen atom, a linear alkyl group having 1 or more and 3 or less carbon atoms, or a branched alkyl group having 1 or more and 3 or less carbon atoms, and particularly preferably a hydrogen atom.

As the dicarboxylic acid unit (C), for example, a 2,6-naphthalenedicarboxylic acid unit (the following formula) is most preferable.

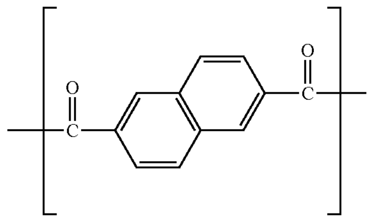

The dicarboxylic acid unit (C) contained in the polyester resin (1) may be used alone or in combination of two or more kinds thereof.

In a case where the polyester resin (1) has the dicarboxylic acid unit (C), the mass proportion of the dicarboxylic acid unit (C) in the polyester resin (1) is, for example, preferably 1% by mass or greater and 20% by mass or less.

Examples of other dicarboxylic acid units include a dicarboxylic acid unit (D) represented by Formula (D).

Formula (D)

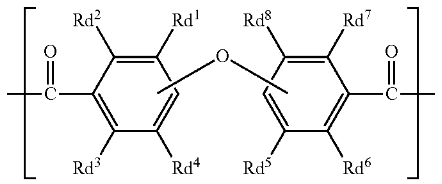

In Formula (D), $Rd^1$, $Rd^2$, $Rd^3$, $Rd^4$, $Rd^5$, $Rd^6$, $Rd^7$, and $Rd^8$ each independently represent a hydrogen atom, an alkyl group having 1 or more and 10 or less carbon atoms, an aryl group having 6 or more and 12 or less carbon atoms, or an alkoxy group having 1 or more and 6 or less carbon atoms.

In Formula (D), the alkyl group having 1 or more and 10 or less carbon atoms may be any of linear, branched, or cyclic. The number of carbon atoms of the alkyl group is, for example, preferably 1 or more and 6 or less, more preferably 1 or more and 4 or less, and still more preferably 1 or 2.

In Formula (D), the aryl group having 6 or more and 12 or less carbon atoms may be any of monocyclic or polycyclic. The number of carbon atoms of the aryl group is, for example, preferably 6 or more and 10 or less and more preferably 6 or more and 9 or less.

In Formula (D), the alkyl group in the alkoxy group having 1 or more and 6 or less carbon atoms may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the respective aspects of the alkyl group, the aryl group, and the alkoxy group in Formula (D) include the same groups as the groups described in Formula (A).

In Formula (D), $Rd^1$, $Rd^2$, $Rd^3$, $Rd^4$, $Rd^5$, $Rd^6$, $Rd^7$, and $Rd^8$ each independently represent, for example, preferably a hydrogen atom, a linear alkyl group having 1 or more and 6 or less carbon atoms, or a branched alkyl group having 1 or more and 6 or less carbon atoms, more preferably a hydrogen atom, a linear alkyl group having 1 or more and 4 or less carbon atoms, or a branched alkyl group having 1 or more and 4 or less carbon atoms, still more preferably a hydrogen atom, a linear alkyl group having 1 or more and 3 or less carbon atoms, or a branched alkyl group having 1 or more and 3 or less carbon atoms, and particularly preferably a hydrogen atom.

It is preferable that the dicarboxylic acid unit (D) is, for example, a constitutional unit represented by Formula (D').

Formula (D')

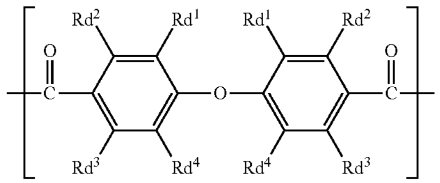

$Rd^1$, $Rd^2$, $Rd^3$, and $Rd^4$ in Formula (D') each have the same definition as that for $Rd^1$, $Rd^2$, $Rd^3$, and $Rd^4$ in Formula (D), and the preferable aspects thereof are the same as described above.

As the dicarboxylic acid unit (D), for example, a diphenyl ether-4,4'-dicarboxylic acid unit (the following formula) is most preferable.

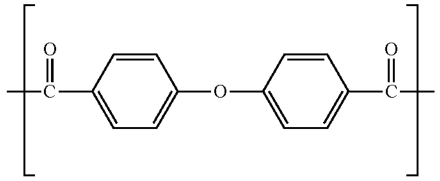

The dicarboxylic acid unit (D) contained in the polyester resin (1) may be used alone or in combination of two or more kinds thereof.

In a case where the polyester resin (1) has the dicarboxylic acid unit (D), the mass proportion of the dicarboxylic acid unit (D) in the polyester resin (1) is, for example, preferably 1% by mass or greater and 20% by mass or less.

Examples of other dicarboxylic acid units include aliphatic dicarboxylic acids (such as oxalic acid, malonic acid, maleic acid, fumaric acid, citraconic acid, itaconic acid, glutaconic acid, succinic acid, alkenyl succinic acid, adipic acid, and sebacic acid) units, alicyclic dicarboxylic acid (such as cyclohexanedicarboxylic acid) units, and lower (for example, having 1 or more and 5 or less carbon atoms) alkyl ester units thereof. These dicarboxylic acid units contained in the polyester resin (1) may be used alone or in combination of two or more kinds thereof.

The polyester resin (1) may have other diol units in addition to the diol unit (B).

Examples of other diol units include a diol unit (E) represented by Formula (E).

Formula (E)

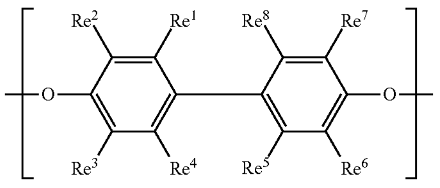

In Formula (E), $Re^1$, $Re^2$, $Re^3$, $Re^4$, $Re^5$, $Re^6$, $Re^7$, and $Re^8$ each independently represent a hydrogen atom, an alkyl group having 1 or more and 10 or less carbon atoms, an aryl group having 6 or more and 12 or less carbon atoms, an aralkyl group having 7 or more and 20 or less carbon atoms, or an alkoxy group having 1 or more and 6 or less carbon atoms.

In Formula (E), the alkyl group having 1 or more and 10 or less carbon atoms may be any of linear, branched, or cyclic. The number of carbon atoms of the alkyl group is, for example, preferably 1 or more and 6 or less, more preferably 1 or more and 4 or less, and still more preferably 1 or 2.

In Formula (E), the aryl group having 6 or more and 12 or less carbon atoms may be any of monocyclic or polycyclic. The number of carbon atoms of the aryl group is, for example, preferably 6 or more and 10 or less and more preferably 6 or more and 9 or less.

In Formula (E), the aryl group in the aralkyl group having 7 or more and 20 or less carbon atoms may be any of monocyclic or polycyclic, and the alkyl group in the aralkyl group having 7 or more and 20 or less carbon atoms is any of linear, branched, or cyclic. The number of carbon atoms of the aryl group is, for example, preferably 6 or more and 10 or less and more preferably 6 or more and 9 or less. The number of carbon atoms of the alkyl group is, for example, preferably 1 or more and 6 or less, more preferably 1 or more and 5 or less, and still more preferably 1 or more and 4 or less.

In Formula (E), the alkyl group in the alkoxy group having 1 or more and 6 or less carbon atoms may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the respective aspects of the alkyl group, the aryl group, the aralkyl group, and the alkoxy group in Formula (E) include the same groups as the groups described in Formula (B).

In Formula (E), $Re^1$, $Re^2$, $Re^3$, $Re^4$, $Re^5$, $Re^6$, $Re^7$, and $Re^8$ each independently represent, for example, preferably a hydrogen atom, a linear alkyl group having 1 or more and 6 or less carbon atoms, or a branched alkyl group having 1 or more and 6 or less carbon atoms, more preferably a hydrogen atom, a linear alkyl group having 1 or more and 4 or less carbon atoms, or a branched alkyl group having 1 or more and 4 or less carbon atoms, still more preferably a hydrogen atom, a linear alkyl group having 1 or more and 3 or less carbon atoms, or a branched alkyl group having 1 or more and 3 or less carbon atoms, and particularly preferably a hydrogen atom or a methyl group.

It is preferable that the diol unit (E) is, for example, a constitutional unit represented by Formula (E').

Formula (E')

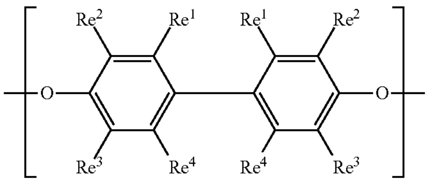

$Re^1$, $Re^2$, $Re^3$, and $Re^4$ in Formula (E') each have the same definition as that for $Re^1$, $Re^2$, $Re^3$, and $Re^4$ in Formula (E), and the preferable aspects thereof are the same as described above.

As the diol unit (E), for example, any of the following units is most preferable.

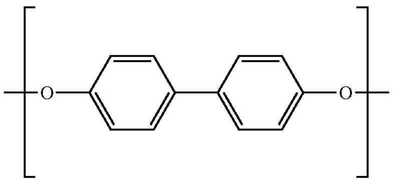

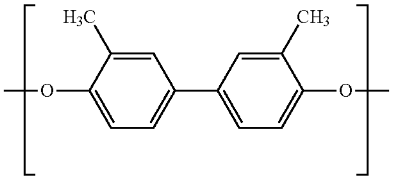

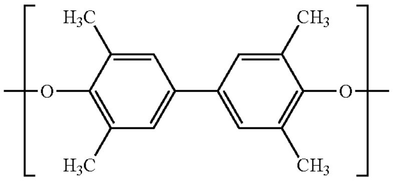

The diol unit (E) contained in the polyester resin (1) may be used alone or in combination of two or more kinds thereof.

In a case where the polyester resin (1) has a diol unit (E), the mass proportion of the diol unit (E) in the polyester resin (1) is, for example, preferably 1% by mass or greater and 20% by mass or less.

Examples of other diol units include a diol unit (F) represented by Formula (F).

Formula (F)

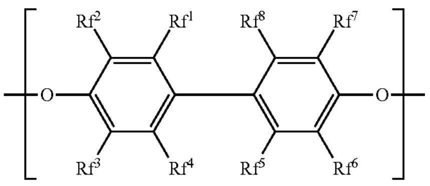

In Formula (F), $Rf^1$, $Rf^2$, $Rf^3$, $Rf^4$, $Rf^5$, $Rf^6$, $Rf^7$, and $Rf^8$ each independently represent a hydrogen atom, an alkyl group having 1 or more and 10 or less carbon atoms, an aryl group having 6 or more and 12 or less carbon atoms, an aralkyl group having a number of 7 or more and 20 or less carbon atoms, or an alkoxy group having 1 or more and 6 or less carbon atoms.

In Formula (F), the alkyl group having 1 or more and 10 or less carbon atoms may be any of linear, branched, or cyclic. The number of carbon atoms of the alkyl group is, for example, preferably 1 or more and 6 or less, more preferably 1 or more and 4 or less, and still more preferably 1 or 2.

In Formula (F), the aryl group having 6 or more and 12 or less carbon atoms may be any of monocyclic or polycyclic. The number of carbon atoms of the aryl group is, for example, preferably 6 or more and 10 or less and more preferably 6 or more and 9 or less.

In Formula (F), the aryl group in the aralkyl group having 7 or more and 20 or less carbon atoms may be any of monocyclic or polycyclic, and the alkyl group in the aralkyl group having 7 or more and 20 or less carbon atoms may be any of linear, branched, or cyclic. The number of carbon atoms of the aryl group is, for example, preferably 6 or more and 10 or less and more preferably 6 or more and 9 or less. The number of carbon atoms of the alkyl group is, for example, preferably 1 or more and 6 or less, more preferably 1 or more and 5 or less, and still more preferably 1 or more and 4 or less.

In Formula (F), the alkyl group in the alkoxy group having 1 or more and 6 or less carbon atoms may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the respective aspects of the alkyl group, the aryl group, the aralkyl group, and the alkoxy group in Formula (F) include the same groups as the groups described in Formula (B).

In Formula (F), $Rf^1$, $Rf^2$, $Rf^3$, $Rf^4$, $Rf^5$, $Rf^6$, $Rf^7$, and $Rf^8$ each independently represent, for example, preferably a hydrogen atom, a linear alkyl group having 1 or more and 6 or less carbon atoms, or a branched alkyl group having 1 or more and 6 or less carbon atoms, more preferably a hydrogen atom, a linear alkyl group having 1 or more and 4 or less carbon atoms, or a branched alkyl group having 1 or more and 4 or less carbon atoms, still more preferably a hydrogen atom, a linear alkyl group having 1 or more and 3 or less carbon atoms, or a branched alkyl group having 1 or more and 3 or less carbon atoms, and particularly preferably a hydrogen atom or a methyl group.

It is preferable that the diol unit (F) is, for example, a constitutional unit represented by Formula (F').

Formula (F)

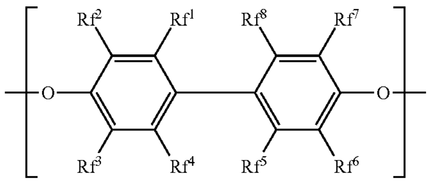

$Rf^1$, $Rf^2$, $Rf^3$, and $Rf^4$ in Formula (F') each have the same definition as that for $Rf^1$, $Rf^2$, $Rf^3$, and $Rf^4$ in Formula (F), and the preferable aspects thereof are the same as described above.

As the diol unit (F), for example, a bis(4-hydroxyphenyl) ether unit (the following formula) is most preferable.

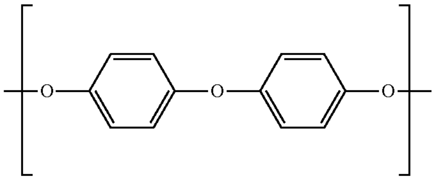

The diol unit (F) contained in the polyester resin (1) may be used alone or in combination of two or more kinds thereof.

In a case where the polyester resin (1) has a diol unit (F), the mass proportion of the diol unit (F) in the polyester resin (1) is, for example, preferably 1% by mass or greater and 20% by mass or less.

Examples of other diol units include aliphatic diol (such as ethylene glycol, diethylene glycol, triethylene glycol, propylene glycol, butanediol, hexanediol, and neopentyl glycol) units and alicyclic diol (such as cyclohexanediol, cyclohexane dimethanol, and hydrogenated bisphenol A) units. These diol units contained in the polyester resin (1) may be used alone or in combination of two or more kinds thereof.

The polyester resin (1) can be obtained by polycondensing a monomer providing a dicarboxylic acid unit (A), a monomer providing a diol unit (B), and other monomers as necessary using a method of the related art. Examples of the method of polycondensing monomers include an interfacial polymerization method, a solution polymerization method, and a melt polymerization method. The interfacial polymerization method is a polymerization method of mixing a divalent carboxylic acid halide dissolved in an organic solvent that is incompatible with water and dihydric alcohol dissolved in an alkali aqueous solution to obtain polyester. Examples of documents related to the interfacial polymerization method include W. M. EARECKSON, J. Poly. Sci., XL399, 1959, and JP1965-1959B (JP-S40-1959B). Since the interfacial polymerization method enables the reaction to proceed faster than the reaction carried out by the solution polymerization method and also enables suppression of hydrolysis of the divalent carboxylic acid halide, as a result, a high-molecular-weight polyester resin can be obtained.

A terminal of the polyester resin (1) may be sealed or modified with a terminal-sealing agent, a molecular weight modifier, or the like used during the production. Examples of the terminal-sealing agent or the molecular weight modifier include monohydric phenol, monovalent acid chloride, monohydric alcohol, and monovalent carboxylic acid.

Examples of the monohydric phenol include phenol, o-cresol, m-cresol, p-cresol, o-ethylphenol, m-ethylphenol, p-ethylphenol, o-propylphenol, m-propylphenol, p-propylphenol, o-tert-butylphenol, m-tert-butylphenol, p-tert-butylphenol, pentylphenol, hexylphenol, octylphenol, nonylphenol, a 2,6-dimethylphenol derivative, a 2-methylphenol derivative, o-phenylphenol, m-phenylphenol, p-phenylphenol, o-methoxyphenol, m-methoxyphenol, p-methoxyphenol, 2,3,6-trimethylphenol, 2,3-xylenol, 2,4-xylenol, 2,5-xylenol, 2,6-xylenol, 3,4-xylenol, 3,5-xylenol, 2-phenyl-2-(4-hydroxyphenyl)propane, 2-phenyl-2-(2-hydroxyphenyl)propane, and 2-phenyl-2-(3-hydroxyphenyl) propane.

Examples of the monovalent acid chloride include monofunctional acid halides such as benzoyl chloride, benzoic acid chloride, methanesulfonyl chloride, phenylchloroformate, acetic acid chloride, butyric acid chloride, octyl acid chloride, benzenesulfonyl chloride, benzenesulfinyl chloride, sulfinyl chloride, benzene phosphonyl chloride, and substituents thereof.

Examples of the monohydric alcohol include methanol, ethanol, n-propanol, isopropanol, n-butanol, 2-butanol, pentanol, hexanol, dodecyl alcohol, stearyl alcohol, benzyl alcohol, and phenethyl alcohol.

Examples of the monovalent carboxylic acid include acetic acid, propionic acid, octanoic acid, cyclohexanecarboxylic acid, benzoic acid, toluic acid, phenylacetic acid, p-tert-butylbenzoic acid, and p-methoxyphenylacetic acid.

[Conductive Substrate]

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term “conductive” denotes that the volume resistivity is less than $1\times10^{13}$ Ωcm.

In a case where the electrophotographic photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring during irradiation with laser beams. In a case where incoherent light is used as a light source, roughening of the surface to prevent interference fringes is not particularly necessary, and it is suitable for longer life because occurrence of defects due to the unevenness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active as it is, is easily contaminated, and has a large resistance fluctuation depending on the environment. Therefore, for example, it is preferable that a sealing treatment is performed on the porous anodized film so that the fine pores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42° C. or higher and 48° C. or lower. The film thickness of the coating film is, for example, preferably 0.3 μm or greater and 15 μm or less.

The boehmite treatment is carried out, for example, by immersing the conductive substrate in pure water at 90° C. or higher and 100° C. or lower for 5 minutes to 60 minutes or by bringing the conductive substrate into contact with heated steam at 90° C. or higher and 120° C. or lower for 5 minutes to 60 minutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

[Undercoat Layer]

The undercoat layer is, for example, a layer containing inorganic particles and a binder resin.

Examples of the inorganic particles include inorganic particles having a powder resistance (volume resistivity) of $1\times10^{2}$ Ωcm or greater and $1\times10^{11}$ Ωcm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2/g$ or greater.

The volume average particle diameter of the inorganic particles may be, for example, 50 nm or greater and 2,000 nm or less (for example, preferably 60 nm or greater and 1,000 nm or less).

The content of the inorganic particles is, for example, preferably 10% by mass or greater and 80% by mass or less and more preferably 40% by mass or greater and 80% by mass or less with respect to the amount of the binder resin.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, a silane coupling agent is preferable, and a silane coupling agent containing an amino group is more preferable.

Examples of the silane coupling agent containing an amino group include 3-aminopropyltriethoxysilane, N-2-

(aminoethyl)-3-aminopropyltrimethoxysilane, N-2-(aminoethyl)-3-aminopropylmethyldimethoxysilane, and N,N-bis (2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

The undercoat layer may contain an electron accepting compound (acceptor compound) together with the inorganic particles from the viewpoint of enhancing the long-term stability of the electrical characteristics and the carrier blocking properties.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis (4-naphthyl)-1,3,4-oxadiazole, or 2,5-bis(4-diethylaminophenyl)-1,3,4-oxadiazole; a xanthone-based compound; a thiophenone compound; a diphenoquinone compound such as 3,3',5,5'-tetra-t-butyldiphenoquinone; and a benzophenone compound.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particle include a dry method and a wet method.

The dry method is, for example, a method of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100° C. or higher. The baking is not particularly limited as long as the temperature and the time are adjusted such that the electrophotographic characteristics can be obtained.

The wet method is, for example, a method of attaching the electron-accepting compound to the surface of each inorganic particle by adding the electron-accepting compound to inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

The electron-accepting compound may be attached to the surface before the inorganic particles are subjected to a surface treatment with a surface treatment agent or simultaneously with the surface treatment performed on the inorganic particles with a surface treatment agent.

The content of the electron-accepting compound may be, for example, 0.01% by mass or greater and 20% by mass or less and preferably 0.01% by mass or greater and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical characteristics, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl) ethyltrimethoxysilane, 3-glycydoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isosterate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, ethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater.

The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles when preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

The thickness of the undercoat layer is set to, for example, preferably 15 μm or greater and more preferably 20 μm or greater and 50 μm or less.

[Interlayer]

An interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, a knife coating method, and a curtain coating method.

The thickness of the interlayer is set to be, for example, preferably in a range of 0.1 μm or greater and 3 μm or less. The interlayer may be used as the undercoat layer.

[Charge Generation Layer]

The charge generation layer is, for example, a layer containing a charge generation material and a binder resin. Further, the charge generation layer may be a deposition layer of the charge generation material. The deposition layer of the charge generation material is, for example, preferable in a case where an incoherent light such as a light emitting diode (LED) or an organic electro-luminesence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichloro-tin phthalocyanine, and titanyl phthalocyanine are more preferable.

Meanwhile, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur when a thin film having a thickness of 20 μm or less is used as the photosensitive layer. The above-described tendency is evident when a p-type semiconductor such as trigonal selenium or a phthalocyanine pigment is used as the charge generation material that is likely to generate a dark current.

Meanwhile, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer. The n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, an urethane resin, an epoxy resin, casein, a polyvinyl alcohol resin, and a polyvinylpyrrolidone resin. Here, the term "insulating" denotes that the volume resistivity is $1\times10^{13}$ Ωcm or greater.

These binder resins may be used alone or in the form of a mixture of two or more kinds thereof.

The blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. The charge generation layer may be formed by vapor deposition of the charge generation material. The formation of the charge generation layer by vapor deposition is, for example, particularly preferable in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type homogenizer in which a dispersion liquid is dispersed by a liquid-liquid collision or a liquid-wall collision in a high-pressure state, and a penetration type homogenizer in which a dispersion liquid is dispersed by penetrating the liquid through a fine flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The thickness of the charge generation layer is set to, for example, preferably 0.1 μm or greater and 5.0 μm or less and more preferably 0.2 μm or greater and 2.0 μm or less.

[Charge Transport Layer]

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

Examples of the polymer charge transport material include known compounds having charge transport properties, such as poly-N-vinylcarbazole and polysilane. For example, a polyester-based polymer charge transport material is preferable. The polymer charge transport material may be used alone or in combination with a binder resin.

Examples of the charge transport material or the polymer charge transport material include a polycyclic aromatic compound, an aromatic nitro compound, an aromatic amine compound, a heterocyclic compound, a hydrazone compound, a styryl compound, an enamine compound, a benzidine compound, a triarylamine compound (particularly, a triphenylamine compound), a diamine compound, an oxadiazole compound, a carbazole compound, an organic polysilane compound, a pyrazoline compound, an indole compound, an oxazole compound, an isoxazole compound, a thiazole compound, a thiadiazole compound, an imidazole compound, a pyrazole compound, a triazole compound, a cyano compound, a benzofuran compound, an aniline compound, a butadiene compound, and a resin containing a group derived from any of these substances. Specific examples thereof include compounds described in paragraphs 0078 to 0080 of JP2021-117377A, paragraphs 0046 to 0048 of JP2019-035900A, paragraphs 0052 and 0053 of JP2019-012141A, paragraphs 0122 to 0134 of JP2021-071565A, paragraphs 0101 to 0110 of JP2021-015223A, paragraph 0116 of JP2013-097300A, paragraphs 0309 to 0316 of WO2019/070003A, paragraphs 0103 to 0107 of JP2018-159087A, and paragraphs 0102 to 0113 of JP2021-148818A.

From the viewpoint of the charge mobility, for example, it is preferable that the charge transport material contains at least ono selected from the group consisting of a compound (G1) represented by Formula (G1), a compound (G2) represented by Formula (G2), a compound (G3) represented by Formula (G3), and a compound (G4) represented by Formula (G4).

Formula (G1)

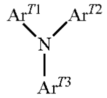

In Formula (G1), $Ar^{T1}$, $Ar^{T2}$, and $Ar^{T3}$ each independently represent an aryl group, $—C_6H_4—C(R^{T4})=C(R^{T5})(R^{T6})$, or $—C_6H_4—CH=CH—CH=C(R^{T7})(R^{T8})$. $R^{T4}$, $R^{T5}$, $R^{T6}$, $R^{T7}$, and $R^{T8}$ each independently represent a hydrogen atom, an alkyl group, or an aryl group. In a case where $R^{T5}$ and $R^{T6}$ represent an aryl group, the aryl groups may be linked via a divalent group of $—C(R^{51})(R^{52})—$ and/or $—C(R^{61})=C(R^{62})—$. $R^{51}$, $R^{52}$, $R^{61}$, and $R^{62}$ each independently represent a hydrogen atom or an alkyl group having 1 or more and 3 or less carbon atoms.

The group in Formula (G1) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

From the viewpoint of the charge mobility, as the compound (G1), for example, a compound containing at least one of an aryl group or $—C_6H_4—CH=CH—CH=C(R^{T7})(R^{T8})$ is preferable, and a compound (G'1) represented by Formula (G'1) is more preferable.

Formula (G'1)

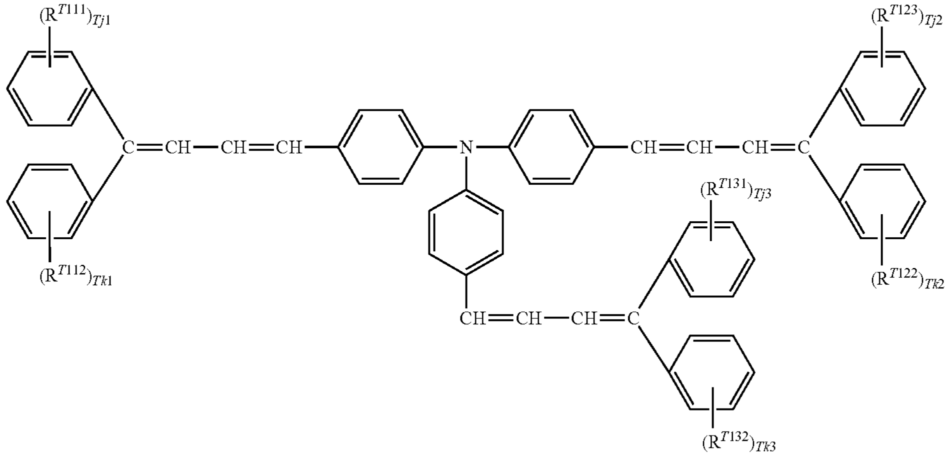

In Formula (G'1), $R^{T111}$, $R^{T112}$, $R^{T121}$, $R^{T122}$, $R^{T131}$, and $R^{T132}$ each independently represent a hydrogen atom, a halogen atom, an alkyl group (for example, preferably an alkyl group having 1 or more and 3 or less carbon atoms), an alkoxy group (for example, preferably an alkoxy group having 1 or more and 3 or less carbon atoms), a phenyl group, or a phenoxy group. Tj1, Tj2, Tj3, Tk1, Tk2, and Tk3 each independently represent 0, 1, or 2.

Formula (G2)

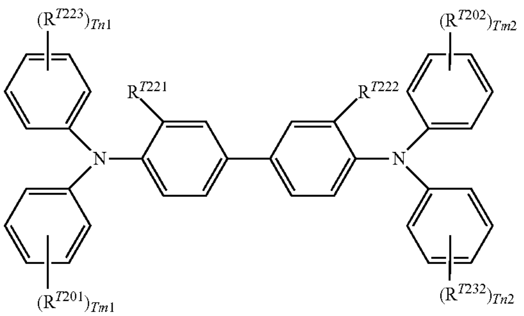

In Formula (G2), $R^{T201}$, $R^{T202}$, $R^{T211}$, and $R^{T212}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, $—C(R^{T21})═C(R^{T22})(R^{T23})$, or $—CH═CH—CH═C(R^{T24})(R^{T25})$. $R^{T21}$, $R^{T22}$, $R^{T23}$, $R^{T24}$, and $R^{T25}$ each independently represent a hydrogen atom, an alkyl group, or an aryl group. $R^{T221}$ and $R^{T222}$ each independently represent a hydrogen atom, a halogen atom, an alkyl groups having 1 or more and 5 or less carbon atoms, or an alkoxy group having 1 or more and 5 or less carbon atoms. Tm1, Tm2, Tn1, and Tn2 each independently represent 0, 1, or 2.

The group in Formula (G2) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

From the viewpoint of the charge mobility, as the compound (G2), for example, a compound containing at least one of an alkyl group, an aryl group, or $—CH═CH—CH═C(R^{T24})(R^{T25})$ is preferable, and a compound containing two of an alkyl group, an aryl group, or $—CH═CH—CH═C(R^{T24})(R^{T25})$ is more preferable.

In Formula (G3), $R^{T301}$, $R^{T302}$, $R^{T311}$, and $R^{T312}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, $—C(R^{T31})═C(R^{T32})(R^{T33})$, or $—CH═CH—CH═C(R^{T34})(R^{T35})$. $R^{T31}$, $R^{T32}$, $R^{T33}$, $R^{T34}$, and $R^{T35}$ each independently represent a hydrogen atom, an alkyl group, or an aryl group. $R^{T321}$, $R^{T322}$, and $R^{T331}$ each independently represent a hydrogen atom, a halogen atom, an alkyl group having 1 or more and 5 or less carbon atoms, or an alkoxy group having 1 or more and 5 or less carbon atoms. To1, To2, Tp1, Tp2, Tq1, Tq2, and Tr1 each independently represent 0, 1, or 2.

The group in Formula (G3) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

Formula (G4)

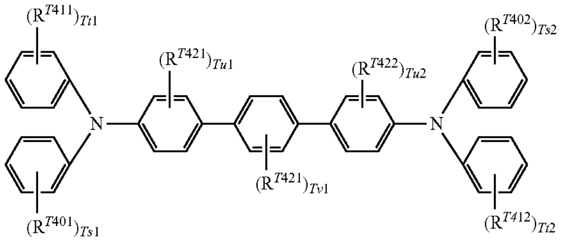

In Formula (G4), $R^{T401}$, $R^{T402}$, $R^{T411}$ and $R^{T412}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, $—C(R^{T41})═C(R^{T42})(R^{T43})$, or $—CH═CH—CH═C(R^{T44})(R^{T45})$. $R^{T41}$, $R^{T42}$, $R^{T43}$, $R^{T44}$, and $R^{T45}$ each independently represent a hydrogen atom, an alkyl group, or an aryl group. $R^{T421}$, $R^{T422}$, and $R^{T431}$ each independently represent a hydrogen atom, a halogen atom, an alkyl group having 1 or more and 5 or less carbon atoms, or an alkoxy group having 1 or more and 5 or less carbon atoms. Ts1, Ts2, Tt1, Tt2, Tu1, Tu2, and Tv1 each independently represent 0, 1, or 2.

The group in Formula (G4) may be substituted with a halogen atom, an alkyl group having 1 or more and 5 or less Formula (G3)

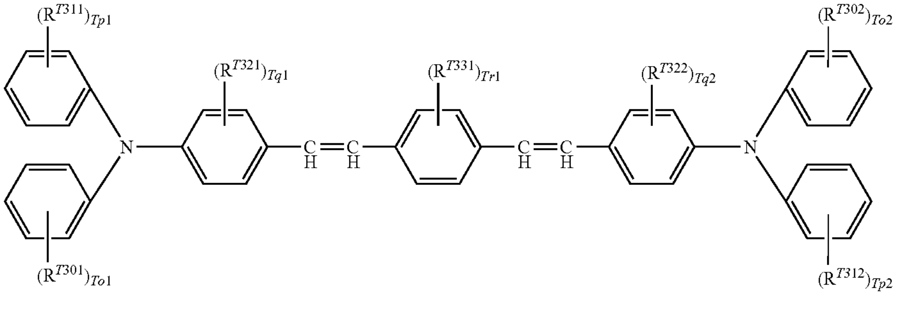

carbon atoms, an alkoxy group having 1 or more and 5 or less carbon atoms, or a substituted amino group substituted with an alkyl group having 1 or more and 3 or less carbon atoms.

The content of the charge transport material contained in the charge transport layer may be, for example, preferably 28% by mass or greater and 55% by mass or less with respect to the total solid content.

The charge transport layer contains at least the polyester resin (1) as a binder resin. The proportion of the polyester resin (1) in the total amount of the binder resin contained in the charge transport layer is, for example, preferably 50% by mass or greater, more preferably 80% by mass or greater, still more preferably 90% by mass or greater, particularly preferably 95% by mass or greater, and most preferably 100% by mass.

The charge transport layer may contain other binder resins in addition to the polyester resin (1). Examples of other binder resins include a polyester resin other than the polyester resin (1), a polycarbonate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. These binder resins may be used alone or in combination of two or more kinds thereof.

The charge transport layer may also contain other known additives. Examples of the additives include an antioxidant, a leveling agent, an antifoaming agent, a filler, and a viscosity adjuster.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in combination of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

The average thickness of the charge transport layer is, for example, preferably 27 μm or greater and 50 μm or less, more preferably 31 μm or greater and 48 μm or less, and still more preferably 35 μm or greater and 46 μm or less.

[Single Layer Type Photosensitive Layer]

The single layer type photosensitive layer (charge generation/charge transport layer) is a layer containing a charge generation material, a charge transport material, a binder resin, and as necessary, other additives. These materials are the same as the materials described in the sections of the charge generation layer and the charge transport layer.

The single layer type photosensitive layer contains at least the polyester resin (1) as a binder resin. The proportion of the polyester resin (1) in the total amount of the binder resin contained in the single layer type photosensitive layer is, for example, preferably 50% by mass or greater, more preferably 80% by mass or greater, still more preferably 90% by mass or greater, particularly preferably 95% by mass or greater, and most preferably 100% by mass.

The content of the charge generation material in the single layer type photosensitive layer may be, for example, 0.1% by mass or greater and 10% by mass or less and preferably 0.8% by mass or greater and 5% by mass or less with respect to the total solid content.

The content of the charge transport material contained in the single layer type photosensitive layer may be, for example, 40% by mass or greater and 60% by mass or less with respect to the total solid content.

The method of forming the single layer type photosensitive layer is the same as the method of forming the charge generation layer or the charge transport layer.

The average thickness of the single layer type photosensitive layer is, for example, preferably 27 μm or greater and 50 μm or less, more preferably 31 μm or greater and 48 μm or less, and still more preferably 35 μm or greater and 46 μm or less.

[Protective Layer]

A protective layer is provided on the photosensitive layer as necessary. The protective layer is provided, for example, for the purpose of preventing a chemical change in the photosensitive layer during charging and further improving the mechanical strength of the photosensitive layer.

Therefore, for example, a layer formed of a cured film (crosslinked film) may be applied to the protective layer. Examples of these layers include the layers described in the items 1) and 2) below.

1) A layer formed of a cured film of a composition containing a reactive group-containing charge transport material having a reactive group and a charge-transporting skeleton in an identical molecule (that is, a layer containing a polymer or a crosslinked body of the reactive group-containing charge transport material)

2) A layer formed of a cured film of a composition containing a non-reactive charge transport material and a reactive group-containing non-charge transport material containing a reactive group without having a charge transport skeleton (that is, a layer containing the non-reactive charge transport material and a polymer or crosslinked body of the reactive group-containing non-charge transport material)

Examples of the reactive group of the reactive group-containing charge transport material include known reactive groups such as a chain polymerizable group, an epoxy group, —OH, —OR [here, R represents an alkyl group], —$NH_2$, —SH, —COOH, and —$SiR^{Q1}_{3-Qn}(OR^{Q2})_{Qn}$ [here, $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3].

The chain polymerizable group is not particularly limited as long as the group is a functional group capable of radical polymerization and is, for example, a functional group containing a group having at least a carbon double bond. Specific examples thereof include a vinyl group, a vinyl ether group, a vinyl thioether group, a phenyl vinyl group, a vinyl phenyl group, an acryloyl group, a methacryloyl group, and a group containing at least one selected from derivatives thereof. Among these, from the viewpoint that the reactivity is excellent, for example, a vinyl group, a phenylvinyl group, a vinylphenyl group, an acryloyl group, a methacryloyl group, and a group containing at least one selected from derivatives thereof are preferable as the chain polymerizable group.

The charge-transporting skeleton of the reactive group-containing charge transport material is not particularly limited as long as the skeleton is a known structure in the electrophotographic photoreceptor, and examples thereof include a structure conjugated with a nitrogen atom, which is a skeleton derived from a nitrogen-containing positive hole-transporting compound such as a triarylamine-based compound, a benzidine-based compound, or a hydrazone-based compound. Among these, for example, a triarylamine skeleton is preferable.

The reactive group-containing charge transport material having the reactive group and the charge-transporting skeleton, the non-reactive charge transport material, and the reactive group-containing non-charge transport material may be selected from known materials.

The protective layer may also contain other known additives.

The formation of the protective layer is not particularly limited, and a known forming method is used. For example, a coating film of a coating solution for forming a protective layer in which the above-described components are added to a solvent is formed, and the coating film is dried and, as necessary, subjected to a curing treatment such as heating.

Examples of the solvent for preparing the coating solution for forming a protective layer include an aromatic solvent such as toluene or xylene; a ketone-based solvent such as methyl ethyl ketone, methyl isobutyl ketone, or cyclohexanone; an ester-based solvent such as ethyl acetate or butyl acetate; an ether-based solvent such as tetrahydrofuran or dioxane; a cellosolve-based solvent such as ethylene glycol monomethyl ether; and an alcohol-based solvent such as isopropyl alcohol or butanol. These solvents are used alone or in combination of two or more kinds thereof.

The coating solution for forming a protective layer may be a solvent-less coating solution.

Examples of the method of coating the photosensitive layer (such as the charge transport layer) with the coating solution for forming a protective layer include typical coating methods such as a dip coating method, a push-up coating method, a wire bar coating method, a spray coating method, a blade coating method, a knife coating method, and a curtain coating method.

The thickness of the protective layer is set to, for example, preferably 1 μm or greater and 20 μm or less and more preferably 2 μm or greater and 10 μm or less.

<Image Forming Apparatus and Process Cartridge>

An image forming apparatus according to the present exemplary embodiment includes the electrophotographic photoreceptor, a charging unit that charges a surface of the electrophotographic photoreceptor, an electrostatic latent image forming unit that forms an electrostatic latent image on the surface of the charged electrophotographic photoreceptor, a developing unit that develops the electrostatic latent image formed on the surface of the electrophotographic photoreceptor with a developer containing a toner to form a toner image, and a transfer unit that transfers the toner image to a surface of a recording medium. Further, the electrophotographic photoreceptor according to the present exemplary embodiment is employed as the electrophotographic photoreceptor.

As the image forming apparatus according to the present exemplary embodiment, a known image forming apparatus such as an apparatus including a fixing unit that fixes the toner image transferred to the surface of a recording medium; a direct transfer type apparatus that transfers the toner image formed on the surface of the electrophotographic photoreceptor directly to the recording medium; an intermediate transfer type apparatus that primarily transfers the toner image formed on the surface of the electrophotographic photoreceptor to the surface of the intermediate transfer member and secondarily transfers the toner image transferred to the surface of the intermediate transfer member to the surface of the recording medium; an apparatus including a cleaning unit that cleans the surface of the electrophotographic photoreceptor after the transfer of the toner image and before the charging; an apparatus including a destaticizing unit that irradiates the surface of the electrophotographic photoreceptor with destaticizing light after the transfer of the toner image and before the charging; or an apparatus including an electrophotographic photoreceptor heating member for increasing the temperature of the electrophotographic photoreceptor and decreasing the relative temperature is employed.

In a case of the intermediate transfer type apparatus, the transfer unit is, for example, configured to include an intermediate transfer member having a surface onto which the toner image is transferred, a primary transfer unit primarily transferring the toner image formed on the surface of the electrophotographic photoreceptor to the surface of the intermediate transfer member, and a secondary transfer unit secondarily transferring the toner image transferred to the surface of the intermediate transfer member to the surface of the recording medium.

The image forming apparatus according to the present exemplary embodiment may be any of a dry development type image forming apparatus or a wet development type (development type using a liquid developer) image forming apparatus.

In the image forming apparatus according to the present exemplary embodiment, for example, the portion including the electrophotographic photoreceptor may have a cartridge structure (process cartridge) that is attachable to and detachable from the image forming apparatus. As the process cartridge, for example, a process cartridge including the electrophotographic photoreceptor according to the present exemplary embodiment is preferably used. The process cartridge may include, for example, at least one selected from the group consisting of a charging unit, an electrostatic latent image forming unit, a developing unit, and a transfer unit in addition to the electrophotographic photoreceptor.

Hereinafter, an example of the image forming apparatus according to the present exemplary embodiment will be described, but the present exemplary embodiment is not limited thereto. Further, main parts shown in the figures will be described, but description of other parts will not be provided.

Figure 3:
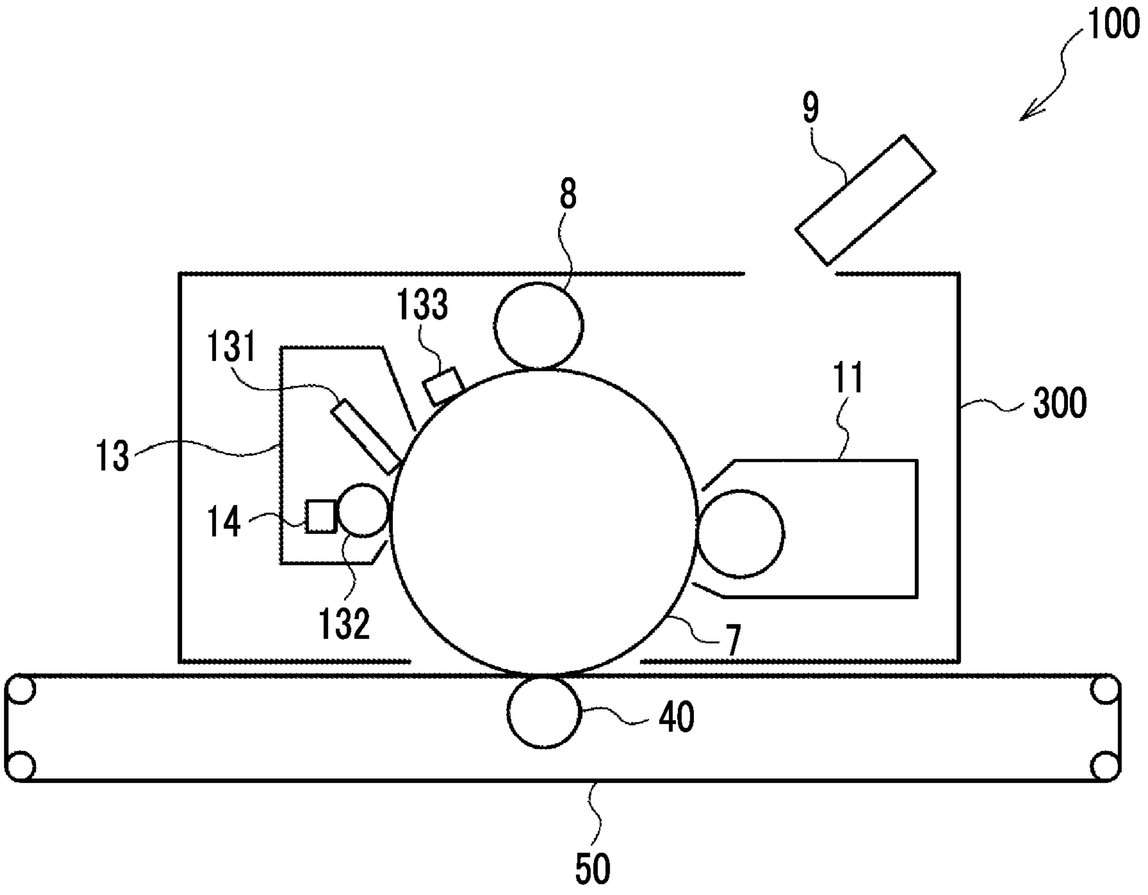
FIG. 3 is a schematic configuration view showing an example of an image forming apparatus according to the present exemplary embodiment.

FIG. 3 is a schematic configuration view showing an example of an image forming apparatus according to the present exemplary embodiment.

As shown in FIG. 3, an image forming apparatus 100 according to the present exemplary embodiment includes a process cartridge 300 including an electrophotographic photoreceptor 7, an exposure device 9 (an example of an electrostatic latent image forming unit), and a transfer unit 40 (primary transfer device), and an intermediate transfer member 50. In the image forming apparatus 100, the exposure device 9 is disposed at a position that can be exposed to the electrophotographic photoreceptor 7 from an opening portion of the process cartridge 300, the transfer device 40 is disposed at a position that faces the electrophotographic photoreceptor 7 via the intermediate transfer member 50, and the intermediate transfer member 50 is disposed such that a part of the intermediate transfer member 50 is in contact with the electrophotographic photoreceptor 7. Although not shown, the image forming apparatus also includes a secondary transfer device that transfers the toner image transferred to the intermediate transfer member 50 to a recording medium (for example, paper). The intermediate transfer member 50, the transfer device 40 (primary transfer device), and the secondary transfer device (not shown) correspond to an example of the transfer unit.

The process cartridge 300 in FIG. 3 integrally supports the electrophotographic photoreceptor 7, a charging device 8 (an example of the charging unit), a developing device 11 (an example of the developing unit), and a cleaning device 13 (an example of the cleaning unit) in a housing. The cleaning device 13 has a cleaning blade (an example of the cleaning member) 131, and the cleaning blade 131 is disposed to come into contact with the surface of the electrophotographic photoreceptor 7. The cleaning member may be a conductive or insulating fibrous member instead of the aspect of the cleaning blade 131, and may be used alone or in combination with the cleaning blade 131.

FIG. 3 shows an example of an image forming apparatus including a fibrous member 132 (roll shape) that supplies a lubricant 14 to the surface of the electrophotographic photoreceptor 7 and a fibrous member 133 (flat brush shape) that assists cleaning, but these are disposed as necessary.

Hereinafter, each configuration of the image forming apparatus according to the present exemplary embodiment will be described.

—Charging Device—

As the charging device 8, for example, a contact-type charger formed of a conductive or semi-conductive charging roller, a charging brush, a charging film, a charging rubber blade, a charging tube, or the like is used. Further, known chargers such as a non-contact type roller charger, a scorotron charger using corona discharge, and a corotron charger are also used.

—Exposure Device—

Examples of the exposure device 9 include an optical system device that exposes the surface of the electrophotographic photoreceptor 7 to light such as a semiconductor laser beam, LED light, and liquid crystal shutter light in a predetermined image pattern. The wavelength of the light source is within the spectral sensitivity region of the electrophotographic photoreceptor. The mainstream wavelength of a semiconductor laser is near infrared, which has an oscillation wavelength in the vicinity of 780 nm. However, the wavelength is not limited thereto, and a laser having an oscillation wavelength of approximately 600 nm or a laser having an oscillation wavelength of 400 nm or greater and 450 nm or less as a blue laser may also be used. Further, a surface emission type laser light source capable of outputting a multi-beam is also effective for forming a color image.

—Developing Device—

Examples of the developing device 11 include a typical developing device that performs development in contact or non-contact with the developer. The developing device 11 is not particularly limited as long as the developing device has the above-described functions, and is selected depending on the purpose thereof. Examples of the developing device include known developing machines having a function of attaching a one-component developer or a two-component developer to the electrophotographic photoreceptor 7 using a brush, a roller, or the like. Among these, for example, a developing device formed of a developing roller having a surface on which a developer is held is preferably used.

The developer used in the developing device 11 may be a one-component developer containing only a toner or a two-component developer containing a toner and a carrier. Further, the developer may be magnetic or non-magnetic. Known developers are employed as these developers.

—Cleaning Device—

As the cleaning device 13, a cleaning blade type device including the cleaning blade 131 is used. In addition to the cleaning blade type device, a fur brush cleaning type device or a simultaneous development cleaning type device may be employed.

—Transfer Device—

Examples of the transfer device 40 include transfer chargers known per se, for example, a contact-type transfer charger formed of a belt, a roller, a film, and a rubber blade, a scorotron transfer charger using corona discharge, and a corotron transfer charger.

—Intermediate Transfer Member—

As the intermediate transfer member 50, a belt-like intermediate transfer member (intermediate transfer belt) containing semi-conductive polyimide, polyamide-imide, polycarbonate, polyarylate, polyester, rubber, or the like is used. Further, as the form of the intermediate transfer member, a drum-like intermediate transfer member may be used in addition to the belt-like intermediate transfer member.

Figure 4:
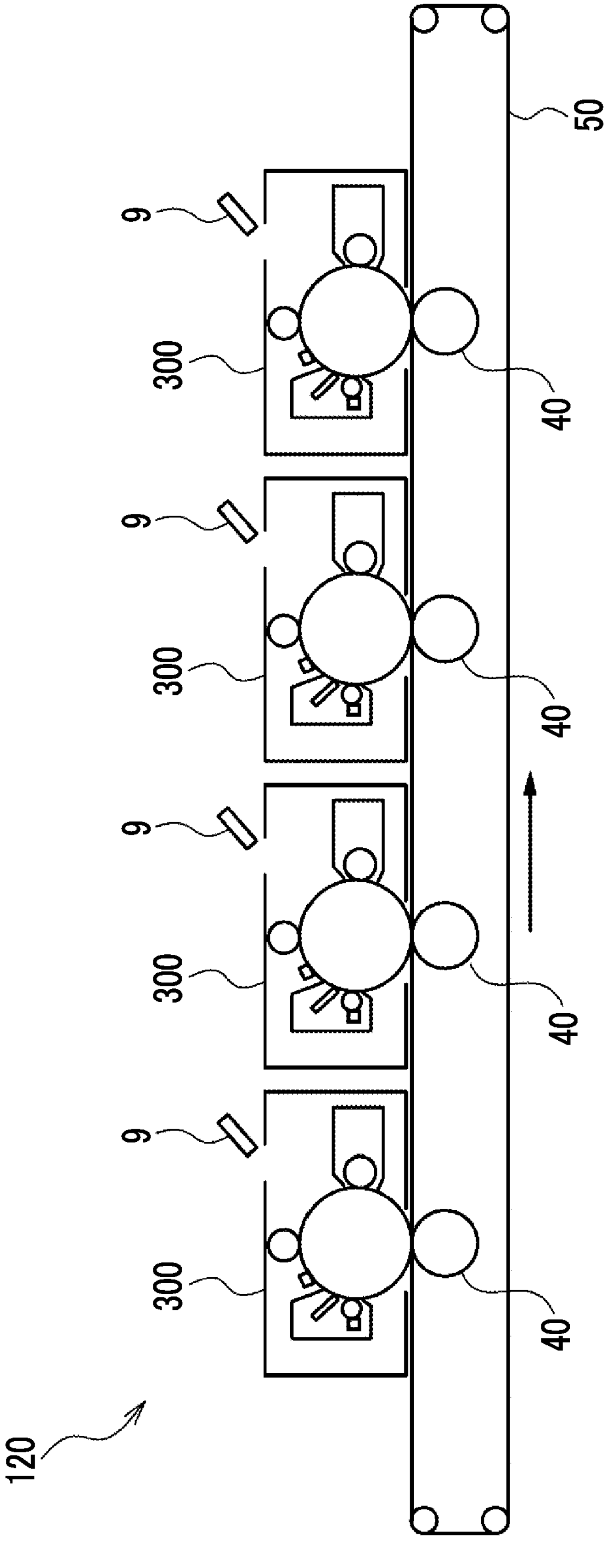
FIG. 4 is a schematic configuration view showing another example of an image forming apparatus according to the present exemplary embodiment.

FIG. 4 is a schematic configuration view showing an example of an image forming apparatus according to the present exemplary embodiment.

An image forming apparatus 120 shown in FIG. 4 is a tandem type multicolor image forming apparatus on which four process cartridges 300 are mounted. The image forming apparatus 120 is formed such that four process cartridges 300 are arranged in parallel on the intermediate transfer member 50, and one electrophotographic photoreceptor is used for each color. The image forming apparatus 120 has the same configuration as the image forming apparatus 100 except that the image forming apparatus 120 is of a tandem type.

EXAMPLES

Hereinafter, exemplary embodiments of the invention will be described in detail based on examples, but the exemplary embodiments of the invention are not limited to the examples. In the following description, "parts" and "%" are on a mass basis unless otherwise specified.

In the following description, the synthesis, the treatment, the production, and the like are carried out at room temperature (25° C.±3° C.) unless otherwise specified.

<Production of Polyester Resin (1)>

[Polyester Resin (1-1)]

12.6373 g of 4,4'-(2-ethylhexylidene)diphenol, 0.1233 g of 4-t butylphenol, 0.0632 g of sodium hydrosulfite, and 240 mL of water are added to a reaction container equipped with a stirrer to prepare a suspension. 4.8392 g of sodium hydroxide, 0.1981 g of benzyltributylammonium chloride, and 160 mL of water are added to the suspension while being stirred at a temperature of 20° C., and the mixture is stirred for 30 minutes in a nitrogen atmosphere. 220 mL of o-dichlorobenzene is added to the aqueous solution, the solution is stirred for 30 minutes in a nitrogen atmosphere, and 12.0000 g of 4,4'-biphenyldicarbonyl chloride is added thereto in a state of powder. After completion of the addition, the reaction is allowed to proceed by stirring the solution at a temperature of 20° C. for 4 hours in a nitrogen atmosphere.

The polymerized solution is diluted with 300 mL of o-dichlorobenzene to remove the aqueous layer. After the solution is washed with a dilute acetic acid solution and ion exchange water, the solution is poured into methanol to precipitate the polymer. The precipitated polymer is separated by filtration and dried at 50° C. The polymer is redissolved in 900 mL of tetrahydrofuran, and the mixture is poured into methanol to precipitate the polymer. The precipitated polymer is separated by filtration, washed with methanol, and dried at 50° C., thereby obtaining 17.5 g of a white polymer.

The molecular weight is measured by gel permeation chromatography (GPC) using tetrahydrofuran as an eluent, and the molecular weight of the polymer is determined as the molecular weight in terms of polystyrene. The weight-average molecular weight Mw of the polymer and the molecular weight distribution Mw/Mn are listed in Table 1 and the like.

[Polyester Resins (1-2) to (1-20) and (C1) to (C6)]

Polyester resins (1-2) to (1-20) and (C1) to (C6) are synthesized in the same manner as in the production step of the polyester resin (1-1) except that the kind of the monomer used and the amount of the monomer added are changed. The kind of the monomer and the amount of the monomer added of the polyester resin are listed in Table 1 and the like.

[Polyester Resin (1-21)]

12.6373 g of 4,4'-(2-ethylhexylidene)diphenol, 8.7845 g of triethylamine, and 70 mL of methylene chloride are added to a reaction container equipped with a stirrer to prepare a solution. 11.9555 g of 4,4'-biphenyldicarbonyl chloride is added to the solution while being stirred at a temperature of 5° C. in a state of powder. After completion of the addition, the reaction is allowed to proceed by increasing the temperature to 30° C. and stirring the solution for 4 hours in a nitrogen atmosphere. The polymerized solution is diluted with 850 mL of tetrahydrofuran and poured into methanol to precipitate the polymer. The precipitated polymer is separated by filtration, washed with methanol, and dried at 50° C. The polymer is redissolved in 850 mL of tetrahydrofuran and poured into methanol to precipitate the polymer. The precipitated polymer is separated by filtration, washed with methanol, and dried at 50° C., thereby obtaining 19.2 g of a white polymer.

10.0000 g of the polymer, 1.2941 g of triethylamine, and 110 mL of methylene chloride are added to a reaction container equipped with a stirrer to prepare a solution. 1.7121 g of benzoyl chloride is added to the solution while being stirred at a temperature of 5° C. After completion of the addition, the reaction is allowed to proceed by increasing the temperature to 30° C. and stirring the solution for 4 hours in a nitrogen atmosphere. The solution after the reaction is diluted with 400 mL of tetrahydrofuran and poured into methanol to precipitate a polymer. The precipitated polymer is separated by filtration, washed with methanol, and dried at 50° C. The polymer is redissolved in 400 mL of tetrahydrofuran and poured into methanol to precipitate the polymer. The precipitated polymer is separated by filtration, washed with methanol, and dried at 50° C., thereby obtaining 8.8 g of a white polymer.

The molecular weight is measured by gel permeation chromatography (GPC) using tetrahydrofuran as an eluent, and the molecular weight of the polymer is determined as the molecular weight in terms of polystyrene. The weight-average molecular weight Mw of the polymer and the molecular weight distribution Mw/Mn are listed in Table 2 and the like.

Tables 1 to 4 show "constitutional unit: compositional ratio" (for example, A-12: 41.3). The composition ratio denotes the mass percent of the dicarboxylic acid unit (unit obtained by removing two OH atoms from the dicarboxylic acid of the raw material) and the mass percent of the diol unit (unit obtained by removing two H atoms from the diol of the raw material).

A-12 and the like listed in Table 1 and the like are specific examples of the dicarboxylic acid unit (A) described above.

B-24 and the like listed in Table 1 and the like are specific examples of the diol unit (B) described above.

C-1 and the like listed in Table 1 and the like denote dicarboxylic acid units or diol units described below.

C-1: Naphthalene dicarboxylic acid unit

D-1: Diphenyl ether dicarboxylic acid unit

E-1: o,o'-Dimethyl biphenol unit

F-1: Diphenyl ether diol unit

<Production of Photoreceptor Including Lamination Type Photosensitive Layer>

Example S1

—Formation of Undercoat Layer—

An aluminum cylindrical tube having an outer diameter of 30 mm, a length of 250 mm, and a thickness of 1 mm is prepared as a conductive substrate.

100 parts of zinc oxide (average particle diameter of 70 nm, specific surface area of 15 $m^2/g$, manufactured by Tayca Corporation) is stirred and mixed with 500 parts of toluene, 1.3 parts of a silane coupling agent (trade name: KBM603, manufactured by Shin-Etsu Chemical Co., Ltd., N-2-(aminoethyl)-3-aminopropyltrimethoxysilane) is added thereto, and the mixture is stirred for 2 hours. Thereafter, toluene is distilled off under reduced pressure and baked at 120° C. for 3 hours to obtain zinc oxide subjected to a surface treatment with a silane coupling agent.

110 parts of the surface-treated zinc oxide is stirred and mixed with 500 parts of tetrahydrofuran, a solution obtained by dissolving 0.6 part of alizarin in 50 parts of tetrahydrofuran is added thereto, and the mixture is stirred at 50° C. for 5 hours. Thereafter, the solid content is separated by filtration by carrying out filtration under reduced pressure and dried at 60° C. under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, manufactured by Sumitomo Bayer Urethane Co., Ltd.), and 15 parts of a butyral resin (trade name: S-LEC BM-1, manufactured by Sekisui Chemical Co., Ltd.) in 68 parts of methyl ethyl ketone is mixed with 5 parts of methyl ethyl ketone, and the solution is dispersed in a sand mill for 2 hours using 1 mmϕ glass beads, thereby obtaining a dispersion liquid. 0.005 part of dioctyltin dilaurate as a catalyst and 4 parts of silicone resin particles (trade name: TOSPEARL 145, manufactured by Momentive Performance Materials Inc.) are added to the dispersion liquid, thereby obtaining a coating solution for forming an undercoat layer. The outer peripheral surface of the conductive substrate is coated with the coating solution for forming an undercoat layer by a dip coating method, and dried and cured at 170° C. for 40 minutes to form an undercoat layer. The average thickness of the undercoat layer is 25 μm.

—Formation of Charge Generation Layer—

A mixture consisting of 15 parts of hydroxygallium phthalocyanine as a charge generation substance (Bragg angle (2θ±0.2°) of the X-ray diffraction spectrum using Cukα characteristic X-ray has diffraction peaks at at least positions of 7.5°, 9.9°, 12.5, 16.3°, 18.6°, 25.1°, and 28.3°), 10 parts of a vinyl chloride-vinyl acetate copolymer resin (trade name: VMCH, Nippon Unicar Company Limited) as a binder resin, and 200 parts of n-butyl acetate is dispersed in a sand mill for 4 hours using glass beads having a diameter of 1 mm. 175 parts of n-butyl acetate and 180 parts of methyl ethyl ketone are added to the dispersion liquid, and the mixture is stirred, thereby obtaining a coating solution for forming a charge generation layer. The under-coat layer is immersed in and coated with the coating solution for forming a charge generation layer, and dried at room temperature (25° C.±3° C.) to form a charge generation layer having an average thickness of 0.18 μm.

—Formation of Charge Transport Layer—

60 parts of the polyester resin (1-1) as a binder resin and 40 parts of HTM-1 as a charge transport material are dissolved in 270 parts of tetrahydrofuran and 30 parts of toluene, thereby obtaining a coating solution for forming a charge transport layer. The charge generation layer is immersed in and coated with the coating solution for forming a charge transport layer, and dried at 145° C. for 30 minutes to form ae charge transport layer. The average thickness Ds (μm) of the charge transport layer is listed in Table 1.

HTM-1

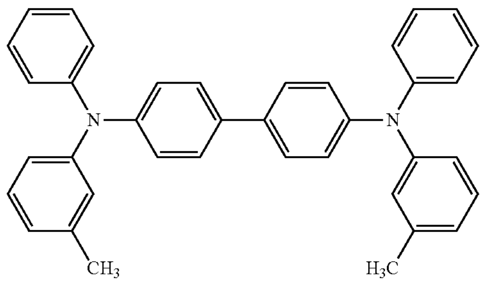

Examples S2 to S26 and Comparative Examples SC1 to SC9

Each photoreceptor is prepared in the same manner as in Example S1 except that the kind of the polyester resin (1), the kind and amount of the charge transport material, and the average thickness Ds of the charge transport layer are changed as listed in Tables 1 and 2 in the formation of the charge transport layer. The charge transport materials HTM-2 to HTM-5 are the following compounds.

HTM-2

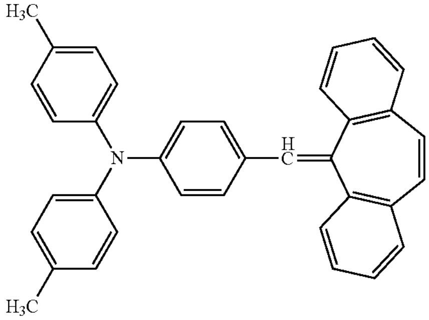

HTM-5

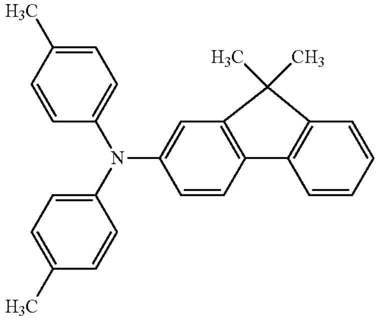

HTM-3

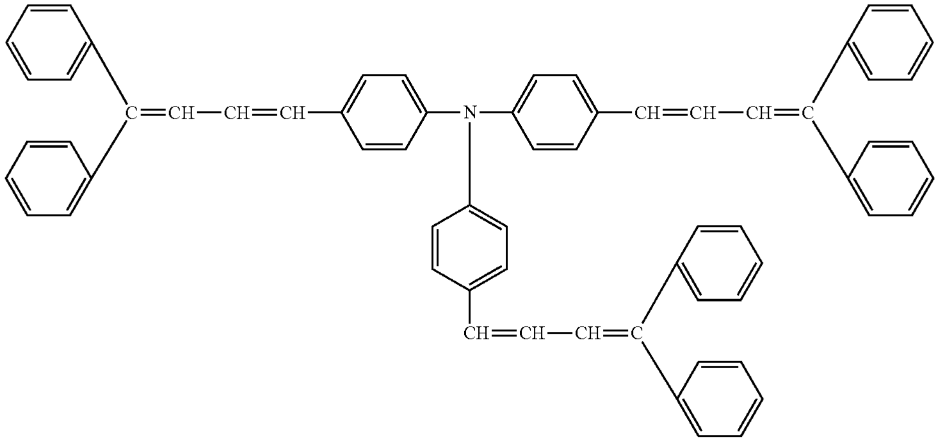

-continued

HTM-4

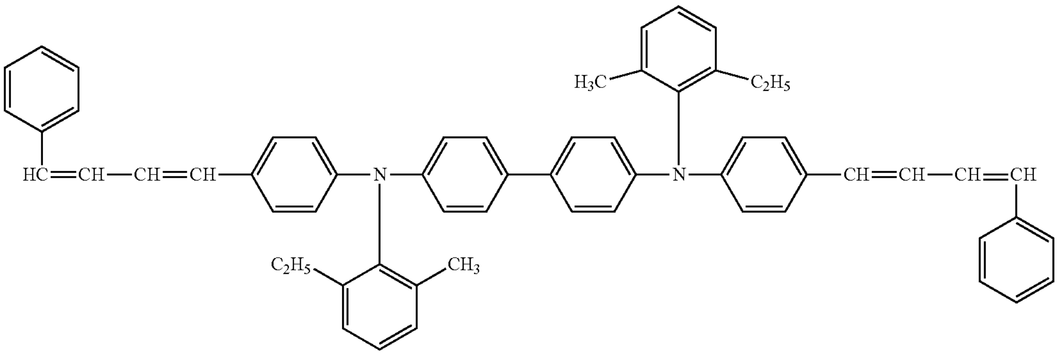

Example S27

A photoreceptor is prepared in the same manner as in Example S1 except that alizarin is changed to 2,3,4-trihydroxybenzophenone in the formation of the undercoat layer, and the kind of the polyester resin (1) and the average thickness Ds of the charge transport layer are changed as listed in Table 2 in the formation of the charge transport layer.

<Production of Photoreceptor Including Single Layer Type Photosensitive Layer>

Example T1

—Formation of Single Layer Type Photosensitive Layer—

52.75 parts of the polyester resin (1-1) as a binder resin, 1.25 parts of V-type hydroxygallium phthalocyanine as a charge generation material (Bragg angle ($2\theta \pm 0.2°$) of the X-ray diffraction spectrum using CuKα characteristic X-ray has diffraction peaks at at least positions of 7.3°, 16.0°, 24.9°, and 28.0°), 7.8 parts of ETM-1 as an electron transport material, 38.2 parts of HTM-1 as a positive hole transport material (mass ratio of 17:83 between ETM-1 and HTM-1), and 175 parts of tetrahydrofuran and 75 parts of toluene as solvents are mixed, the mixture is subjected to a dispersion treatment in a sand mill for 4 hours using glass beads having a diameter of 1 mm, thereby obtaining a coating solution for forming a single layer type photosensitive layer.

An aluminum substrate having an outer diameter of 30 mm, a length of 244.5 mm, and a thickness of 1 mm is coated with the obtained coating solution for forming a photosensitive layer by a dip coating method, and dried and cured at a temperature of 110° C. for 40 minutes to form a single layer type photosensitive layer. The average thickness Dt (μm) of the single layer type photosensitive layer is listed in Table 3.

ETM-1

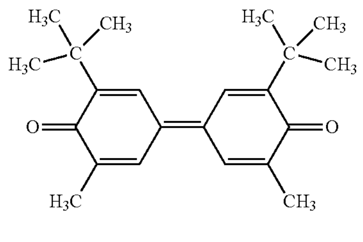

-continued

HTM-1

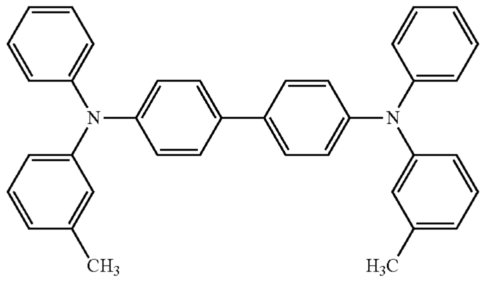

Examples T2 to T19 and Comparative Examples TC1 to TC9

Each photoreceptor is prepared in the same manner as in Example T1 except that the kind of the polyester resin (1), the amount of the charge transport material (here, the mass ratio between ETM-1 and HTM-1 is set to 17:83 which is the same as in Example T1), and the average thickness Dt of the single layer type photosensitive layer are changed as listed in Tables 3 and 4 in the formation of the single layer type photosensitive layer.

<Performance Evaluation of Photoreceptor>

[Abrasion Resistance]

The photoreceptor is mounted on an electrophotographic type image forming apparatus (DocuCentre f1100, manufactured by FUJIFILM Business Innovation Corporation), and a 100% solid image with an image density (area coverage) of 100% is printed on 100,000 sheets of A3 size paper in an environment of a temperature of 10° C. and a relative humidity of 15%. The average thickness of the charge transport layer (or the single layer type photosensitive layer) is acquired before and after the image formation, and a difference in the average thickness before and after the image formation is defined as the amount of abrasion (nm). A PERMASCOPE (manufactured by Fisher Instruments K.K.) is used as a film thickness measuring machine. The amount of abrasion is classified as follows. The results are listed in Tables 1 to 4.

A: The amount of abrasion is less than 500 nm.

B: The amount of abrasion is 500 nm or greater and less than 1,000 nm.

C: The amount of abrasion is 1,000 nm or greater and less than 1,500 nm.

D: The amount of abrasion is 1,500 nm or greater and less than 2,000 nm.

E: The amount of abrasion is 2,000 nm or greater.

[Electrical Characteristics]

In the image formation, the residual potentials on the surface of the photoreceptor are respectively measured after the first image is output and after 100,000 images are output, and a difference between the absolute values (absolute value of residual potential after 100,000 images are output−absolute value of residual potential after first image is output) is acquired and set as a value of an increase in the absolute value of the residual potential. The obtained values are classified as follows. The results are listed in Tables 1 to 4.

A: The value of an increase in the absolute value of the residual potential is less than 20 V.

B: The value of an increase in the absolute value of the residual potential is 20 V or greater and less than 30 V.

C: The value of an increase in the absolute value of the residual potential is 30 V or greater and less than 40 V.

D: The value of an increase in the absolute value of the residual potential is 40 V or greater and less than 50 V.

E: The value of an increase in the absolute value of the residual potential is 50 V or greater.

[Peeling of Photosensitive Layer]

In the image formation, the photoreceptor after 100,000 images are output is observed, and the state of the peeling of the film from the entire surface of the photoreceptor is classified as follows. The results are listed in Tables 1 to 4.

A: Peeling is not found.

B: Peeling of the film within a width of 2 mm is found at an end portion.

C: Peeling of the film within a width of 2 mm is found at both a central portion and an end portion.

D: Peeling of the film within a width of 5 mm is found at both a central portion and an end portion.

E: Peeling of the film with a width of 5 mm or greater is found on the entire surface.

[Initial Image Quality and Image Quality After Traveling]

The photoreceptor is installed on a drum cartridge, and the drum cartridge is mounted on an image forming apparatus ApeosPort C4300 (manufactured by FUJIFILM Business Innovation Corporation) equipped with a potential sensor, and 50% halftone images are output on 100,000 sheets of A4 size paper in an environment of a temperature of 28° C. and a relative humidity of 85%. The image graininess of the first and 100,000th output images is observed visually and with a loupe, and the results are classified as follows. The results are listed in Tables 1 to 4.

A: Image defects are not found.

B: A trace amount of image defects is found in a case where the images are viewed with a loupe, but it is within a practically acceptable range.

C: Image defects are visually observed.

D: Image defects are visually observed in an elongated streak shape.

E: Image defects are visually observed in an elongated streak shape. Density unevenness is clearly confirmed.

TABLE 1

| | Polyester resin (1) or comparative polyester resin | | | | | | | Charge transport material | |
|---|---|---|---|---|---|---|---|---|---|
| | | Dicarboxylic acid unit | | Diol unit | | Mw | | | |
| | Resin No. | Unit (A) % by mass | Other units % by mass | Unit (B) % by mass | Other units % by mass | A [10,000] | Mw/Mn B | Type — | M1/M2 Cs |
| Comparative Example SC1 | C1 | | D-1: 43.1 | B-24: 56.9 | | 10 | 3.1 | HTM-1 | 0.40 |
| Comparative Example SC2 | C2 | A-12: 41.3 | | B-24: 58.7 | | 4 | 2.9 | HTM-1 | 0.40 |
| Comparative Example SC3 | C3 | A-12: 41.3 | | B-24: 58.7 | | 43 | 2.8 | HTM-1 | 0.40 |
| Comparative Example SC4 | C4 | A-12: 41.3 | | B-24: 58.7 | | 11 | 3.2 | HTM-1 | 0.27 |
| Comparative Example SC5 | C4 | A-12: 41.3 | | B-24: 58.7 | | 11 | 3.2 | HTM-1 | 0.56 |
| Comparative Example SC6 | C4 | A-12: 41.3 | | B-24: 58.7 | | 11 | 3.2 | HTM-1 | 0.40 |
| Comparative Example SC7 | C4 | A-12: 41.3 | | B-24: 58.7 | | 11 | 3.2 | HTM-1 | 0.40 |
| Comparative Example SC8 | C5 | A-12: 41.3 | | B-24: 58.7 | | 5 | 2.9 | HTM-1 | 0.56 |
| Comparative Example SC9 | C6 | A-12: 41.3 | | B-24: 58.7 | | 40 | 3.4 | HTM-1 | 0.28 |
| Example S1 | 1-1 | A-12: 41.3 | | B-24: 58.7 | | 10 | 3.0 | HTM-1 | 0.40 |
| Example S2 | 1-2 | A-1: 28.9 | | B-29: 71.1 | | 9 | 2.9 | HTM-1 | 0.40 |
| Example S3 | 1-3 | A-12: 41.4 | | B-11: 58.6 | | 14 | 2.8 | HTM-1 | 0.40 |
| Example S4 | 1-4 | A-12: 37.3 | | B-14: 62.7 | | 10 | 3.2 | HTM-1 | 0.40 |
| Example S5 | 1-5 | A-12: 46.4 | | B-4: 53.6 | | 9 | 2.6 | HTM-1 | 0.40 |
| Example S6 | 1-6 | A-12: 41.9 | | B-33: 58.1 | | 12 | 2.9 | HTM-1 | 0.40 |
| Example S7 | 1-7 | A-12: 43.7 | | B-19: 56.3 | | 10 | 3.0 | HTM-1 | 0.40 |
| Example S8 | 1-1 | A-12: 41.3 | | B-24: 58.7 | | 10 | 3.0 | HTM-1 | 0.52 |
| Example S9 | 1-8 | A-12: 41.3 | | B-24: 58.7 | | 30 | 3.4 | HTM-1 | 0.33 |
| Example S10 | 1-9 | A-12: 41.3 | | B-24: 58.7 | | 6 | 2.7 | HTM-1 | 0.50 |

TABLE 1-continued

| | Average thickness of charge transport layer Ds [μm] | (Cs × 100) | (B × Cs) | Performance evaluation of photoreceptor: Abrasion Resistance | Electrical characteristics | Peeling of photosensitive layer | Initial image quality | Image quality after traveling |
|---|---|---|---|---|---|---|---|---|
| Comparative Example SC1 | 35 | 8.8 | 1.24 | D | C | B | B | E |
| Comparative Example SC2 | 35 | 3.5 | 1.16 | C | A | A | A | C |
| Comparative Example SC3 | 35 | 37.6 | 1.12 | A | B | C | B | C |
| Comparative Example SC4 | 35 | 14.3 | 0.86 | A | C | C | C | D |
| Comparative Example SC5 | 35 | 6.9 | 1.79 | C | A | B | A | C |
| Comparative Example SC6 | 25 | 6.9 | 1.28 | C | A | A | A | B |
| Comparative Example SC7 | 52 | 14.3 | 1.28 | A | C | C | B | C |
| Comparative Example SC8 | 27 | 2.4 | 1.61 | C | A | A | A | C |
| Comparative Example SC9 | 50 | 71.4 | 0.95 | A | C | C | B | C |
| Example S1 | 38 | 9.5 | 1.20 | A | A | A | A | A |
| Example S2 | 37 | 8.3 | 1.16 | B | A | A | A | B |
| Example S3 | 39 | 13.7 | 1.12 | B | A | B | A | B |
| Example S4 | 40 | 10.0 | 1.28 | B | A | B | A | B |
| Example S5 | 37 | 8.3 | 1.04 | B | B | B | A | B |
| Example S6 | 41 | 12.3 | 1.16 | B | A | A | A | A |
| Example S7 | 40 | 10.0 | 1.20 | A | A | A | A | A |
| Example S8 | 38 | 7.3 | 1.56 | B | A | A | A | A |
| Example S9 | 40 | 36.4 | 1.12 | A | B | A | A | B |
| Example S10 | 29 | 3.5 | 1.35 | C | A | B | B | B |

TABLE 2

| | Polyester resin (1) or comparative polyester resin | | | | | | | Charge transport material | |
|---|---|---|---|---|---|---|---|---|---|
| | | Dicarboxylic acid unit | | Diol unit | | Mw | | | |
| | Resin No. | Unit (A) % by mass | Other units % by mass | Unit (B) % by mass | Other units % by mass | A [10,000] | Mw/Mn B | Type — | M1/M2 Cs |
| Example S11 | 1-10 | A-12: 43.7 | | B-19: 56.3 | | 11 | 2.4 | HTM-1 | 0.34 |
| Example S12 | 1-11 | A-12: 43.7 | | B-19: 56.3 | | 9 | 3.8 | HTM-1 | 0.47 |
| Example S13 | 1-12 | A-12: 27.1 | D-1: 12.5 | B-29: 60.4 | | 11 | 3.1 | HTM-1 | 0.40 |
| Example S14 | 1-13 | A-12: 23.2 | D-1: 16.6 | B-29: 60.2 | | 11 | 3.1 | HTM-1 | 0.40 |
| Example S15 | 1-14 | A-12: 23.0 | C-1: 13.4 | B-37: 63.5 | | 9 | 2.9 | HTM-1 | 0.38 |
| Example S16 | 1-15 | A-7: 25.5 | D-1: 4.8 | B-29: 69.7 | | 13 | 2.7 | HTM-1 | 0.37 |
| Example S17 | 1-16 | A-12: 42.7 | | B-24: 48.6 | E-1: 8.7 | 11 | 3.3 | HTM-1 | 0.40 |
| Example S18 | 1-17 | A-12: 43.8 | | B-24: 43.6 | F-1: 12.6 | 8 | 2.8 | HTM-1 | 0.40 |
| Example S19 | 1-18 | A-2: 33.0 | | B-22: 67.0 | | 12 | 3.3 | HTM-1 | 0.37 |
| Example S20 | 1-19 | A-12: 31.4<br>A-1: 5.5<br>A-7: 5.5 | | B-19: 57.7 | | 11 | 3.3 | HTM-1 | 0.40 |
| Example S21 | 1-20 | A-12: 41.3 | | B-26: 58.7 | | 9 | 3.5 | HTM-1 | 0.40 |
| Example S22 | 1-21 | A-12: 41.3 | | B-24: 58.7 | | 10 | 3.2 | HTM-1 | 0.39 |
| Example S23 | 1-1 | A-12: 41.3 | | B-24: 58.7 | | 10 | 3.0 | HTM-2 | 0.40 |
| Example S24 | 1-7 | A-12: 43.7 | | B-19: 56.3 | | 10 | 3.0 | HTM-3 | 0.40 |
| Example S25 | 1-1 | A-12: 41.3 | | B-24: 58.7 | | 10 | 3.0 | HTM-4 | 0.40 |
| Example S26 | 1-1 | A-12: 41.3 | | B-24: 58.7 | | 10 | 3.0 | HTM-5 | 0.40 |
| Example S27 | 1-7 | A-12: 43.7 | | B-19: 56.3 | | 10 | 3.0 | HTM-1 | 0.40 |

TABLE 2-continued

| | Average thickness of charge transport layer Ds [μm] | (Cs × 100) | (B × Cs) | Performance evaluation of photoreceptor: Abrasion Resistance | Electrical characteristics | Peeling of photosensitive layer | Initial image quality | Image quality after traveling |
|---|---|---|---|---|---|---|---|---|
| Example S11 | 40 | 12.9 | 0.82 | A | B | A | A | A |
| Example S12 | 40 | 7.7 | 1.79 | C | A | A | A | A |
| Example S13 | 37 | 10.2 | 1.24 | A | A | A | A | A |
| Example S14 | 37 | 10.2 | 1.24 | B | A | A | A | A |
| Example S15 | 36 | 8.5 | 1.10 | B | A | A | A | A |
| Example S16 | 38 | 13.4 | 1.00 | B | B | A | A | B |
| Example S17 | 37 | 10.2 | 1.32 | A | A | A | A | A |
| Example S18 | 39 | 7.8 | 1.12 | A | A | A | A | A |
| Example S19 | 40 | 13.0 | 1.22 | B | B | A | A | B |
| Example S20 | 40 | 11.0 | 1.32 | A | A | A | A | A |
| Example S21 | 40 | 9.0 | 1.40 | A | A | A | A | A |
| Example S22 | 40 | 10.3 | 1.25 | A | A | A | A | A |
| Example S23 | 38 | 9.5 | 1.20 | A | A | A | A | A |
| Example S24 | 40 | 10.0 | 1.20 | A | A | A | A | A |
| Example S25 | 38 | 9.5 | 1.20 | A | A | A | A | A |
| Example S26 | 38 | 9.5 | 1.20 | A | A | A | A | A |
| Example S27 | 40 | 10.0 | 1.20 | A | A | A | A | A |

* Polyester resin (1-21): a polyester resin in which a terminal of the resin is protected by a benzoyl group

TABLE 3

| | Resin No. | Polyester resin (1) or comparative polyester resin: Dicarboxylic acid unit: Unit (A) % by mass | Dicarboxylic acid unit: Other units % by mass | Diol unit: Unit (B) % by mass | Diol unit: Other units % by mass | Mw A [10,000] | Mw/Mn B | Charge transport material M1/M2 Ct |
|---|---|---|---|---|---|---|---|---|
| Comparative Example TC1 | C1 | | D-1: 43.1 | B-24: 56.9 | | 10 | 3.1 | 0.50 |
| Comparative Example TC2 | C2 | A-12: 41.3 | | B-24: 58.7 | | 4 | 2.9 | 0.50 |
| Comparative Example TC3 | C3 | A-12: 41.3 | | B-24: 58.7 | | 43 | 2.8 | 0.50 |
| Comparative Example TC4 | C4 | A-12: 41.3 | | B-24: 58.7 | | 11 | 3.2 | 0.38 |
| Comparative Example TC5 | C4 | A-12: 41.3 | | B-24: 58.7 | | 11 | 3.2 | 0.62 |
| Comparative Example TC6 | C4 | A-12: 41.3 | | B-24: 58.7 | | 11 | 3.2 | 0.50 |
| Comparative Example TC7 | C4 | A-12: 41.3 | | B-24: 58.7 | | 11 | 3.2 | 0.50 |
| Comparative Example TC8 | C5 | A-12: 41.3 | | B-24: 58.7 | | 5 | 2.9 | 0.59 |
| Comparative Example TC9 | C6 | A-12: 41.3 | | B-24: 58.7 | | 40 | 3.4 | 0.40 |
| Example T1 | 1-1 | A-12: 41.3 | | B-24: 58.7 | | 10 | 3.0 | 0.46 |
| Example T2 | 1-2 | A-1: 28.9 | | B-29: 71.1 | | 9 | 2.9 | 0.45 |
| Example T3 | 1-3 | A-12: 41.4 | | B-11: 58.6 | | 14 | 2.8 | 0.46 |
| Example T4 | 1-4 | A-12: 37.3 | | B-14: 62.7 | | 10 | 3.2 | 0.46 |
| Example T5 | 1-5 | A-12: 46.4 | | B-4: 53.6 | | 9 | 2.6 | 0.45 |

TABLE 3-continued

| | Average thickness of single layer type photo-sensitive Dt [μm] | (A × Dt)/(Ct × 100) | (B × Ct) | Performance evaluation of photoreceptor: Abrasion Resistance | Electrical character-itics | Peel-ing of photo-sensitive layer | Initial image quality | Image quality after traveling |
|---|---|---|---|---|---|---|---|---|
| Comparative Example TC1 | 35 | 7.0 | 1.55 | E | D | C | C | E |
| Comparative Example TC2 | 35 | 2.8 | 1.45 | D | B | B | B | D |
| Comparative Example TC3 | 35 | 30.1 | 1.40 | B | C | D | C | D |
| Comparative Example TC4 | 35 | 10.1 | 1.22 | B | D | D | D | E |
| Comparative Example TC5 | 35 | 6.2 | 1.98 | D | B | C | B | D |
| Comparative Example TC6 | 25 | 5.5 | 1.60 | D | B | B | B | C |
| Comparative Example TC7 | 52 | 11.4 | 1.60 | B | D | D | C | D |
| Comparative Example TC8 | 27 | 2.3 | 1.71 | D | B | B | B | D |
| Comparative Example TC9 | 50 | 50.0 | 1.36 | B | D | D | C | D |
| Example T1 | 37 | 8.0 | 1.38 | A | B | A | B | B |
| Example T2 | 39 | 7.8 | 1.31 | B | B | A | B | C |
| Example T3 | 37 | 11.3 | 1.29 | B | B | B | B | C |
| Example T4 | 37 | 8.0 | 1.47 | B | B | B | B | C |
| Example T5 | 39 | 7.8 | 1.17 | B | C | B | B | C |

TABLE 4

| | Polyester resin (1) or comparative polyester resin | | | | | | | |
|---|---|---|---|---|---|---|---|---|
| | | Dicarboxylic acid unit | | Diol unit | | | | Charge |
| | Resin No. | Unit (A) % by mass | Other units % by mass | Unit (B) % by mass | Other units % by mass | Mw A [10,000] | Mw/Mn B | transport material M1/M2 Ct |
| Example T6 | 1-6 | A-12: 41.9 | | B-33: 58.1 | | 12 | 2.9 | 0.46 |
| Example T7 | 1-7 | A-12: 43.7 | | B-19: 56.3 | | 10 | 3.0 | 0.46 |
| Example T8 | 1-1 | A-12: 41.3 | | B-24: 58.7 | | 10 | 3.0 | 0.51 |
| Example T9 | 1-8 | A-12: 41.3 | | B-24: 58.7 | | 30 | 3.4 | 0.40 |
| Example T10 | 1-9 | A-12: 41.3 | | B-24: 58.7 | | 6 | 2.7 | 0.50 |
| Example T11 | 1-10 | A-12: 43.7 | | B-19: 56.3 | | 11 | 2.4 | 0.46 |
| Example T12 | 1-11 | A-12: 43.7 | | B-19: 56.3 | | 9 | 3.8 | 0.58 |
| Example T13 | 1-12 | A-12: 27.1 | D-1: 12.5 | B-29: 60.4 | | 11 | 3.1 | 0.46 |
| Example T14 | 1-13 | A-12: 23.2 | D-1: 16.6 | B-29: 60.2 | | 11 | 3.1 | 0.46 |
| Example T15 | 1-14 | A-12: 23.0 | C-1: 13.4 | B-37: 63.5 | | 9 | 2.9 | 0.44 |
| Example T16 | 1-15 | A-7: 25.5 | D-1: 4.8 | B-29: 69.7 | | 13 | 2.7 | 0.46 |
| Example T17 | 1-16 | A-12: 42.7 | | B-24: 48.6 | E-1: 8.7 | 11 | 3.3 | 0.46 |
| Example T18 | 1-17 | A-12: 43.8 | | B-24: 43.6 | F-1: 12.6 | 8 | 2.8 | 0.46 |
| Example T19 | 1-18 | A-2: 33.0 | | B-22: 67.0 | | 12 | 3.3 | 0.46 |

TABLE 4-continued

| | Average thickness of single layer type photo-sensitive Dt [μm] | (A × Dt)/ (Ct × 100) | (B × Ct) | Performance evaluation of photoreceptor: Abrasion Resistance | Electrical character-itics | Peel-ing of photo-sensitive layer | Initial image quality | Image quality after traveling |
|---|---|---|---|---|---|---|---|---|
| Example T6 | 37 | 9.7 | 1.33 | B | B | A | B | B |
| Example T7 | 37 | 8.0 | 1.38 | A | B | A | B | B |
| Example T8 | 38 | 7.5 | 1.53 | B | B | A | B | B |
| Example T9 | 50 | 37.5 | 1.36 | A | C | A | B | C |
| Example T10 | 29 | 3.5 | 1.35 | C | B | B | C | C |
| Example T11 | 37 | 8.8 | 1.10 | A | C | A | B | B |
| Example T12 | 50 | 7.8 | 2.20 | C | B | A | B | B |
| Example T13 | 37 | 8.8 | 1.43 | A | B | A | B | B |
| Example T14 | 37 | 8.8 | 1.43 | B | B | A | B | B |
| Example T15 | 38 | 7.8 | 1.28 | B | B | A | B | B |
| Example T16 | 37 | 10.5 | 1.24 | B | C | A | B | C |
| Example T17 | 37 | 8.8 | 1.52 | A | B | A | B | B |
| Example T18 | 44 | 7.7 | 1.29 | A | B | A | B | B |
| Example T19 | 37 | 9.7 | 1.52 | B | C | A | B | C |

(1)

An electrophotographic photoreceptor including: a conductive substrate; and a lamination type photosensitive layer disposed on the conductive substrate and including a charge generation layer and a charge transport layer, in which the charge transport layer contains a polyester resin (1) having a dicarboxylic acid unit (A) represented by Formula (A) and a diol unit (B) represented by Formula (B), and a charge transport material, and in a case where a value A is a weight-average molecular weight Mw of the polyester resin (1) contained in the charge transport layer divided by 10,000 (A=Mw/10,000), a value of a ratio M1/M2 of a mass M1 of the charge transport material contained in the charge transport layer to a mass M2 of the charge transport layer is defined as Cs, and an average thickness of the charge transport layer is defined as Ds (μm), expressions of $5 \le A \le 40$, $0.28 \le Cs \le 0.55$, $27 \le Ds \le 50$, and $2.5 \le (A \times Ds)/(Cs \times 100) \le 70.0$ are satisfied.

(2)

The electrophotographic photoreceptor according to (1), in which an expression of $3.6 \le (A \times Ds)/(Cs \times 100) \le 46.0$ is satisfied.

(3)

The electrophotographic photoreceptor according to (1) or (2), in which an expression of $30 \le Ds \le 48$ is satisfied.

(4)

The electrophotographic photoreceptor according to any one of (1) to (3), in which an expression of $6 \le A \le 30$ is satisfied.

(5)

The electrophotographic photoreceptor according to any one of (1) to (4), in which a mass proportion of the dicarboxylic acid unit (A) in the polyester resin (1) is 15% by mass or greater and 60% by mass or less.

(6)

The electrophotographic photoreceptor according to any one of (1) to (5), in which $n^1$ in Formula (A) represents 2.

(7)

The electrophotographic photoreceptor according to any one of (1) to (6), in which in Formula (B), at least one of $Rb^1$ or $Rb^2$ represents a linear alkyl group having 4 or more and 10 or less carbon atoms, a branched alkyl group having 4 or more and 10 or less carbon atoms, an aryl group having 6 or more and 10 or less carbon atoms, or an aralkyl group having 7 or more and 10 or less carbon atoms, or $Rb^1$ and $Rb^2$ are bonded to each other to form a cyclic alkyl group having 5 or more and 12 or less carbon atoms.

(8)

The electrophotographic photoreceptor according to any one of (1) to (7), in which in Formula (B), at least one of $Rb^1$ or $Rb^2$ represents a linear alkyl group having 4 or more and 10 or less carbon atoms or a branched alkyl group having 4 or more and 10 or less carbon atoms.

(9)

An electrophotographic photoreceptor including: a conductive substrate; and a single layer type photosensitive layer disposed on the conductive substrate, in which the single layer type photosensitive layer contains a polyester resin (1) having a dicarboxylic acid unit (A) represented by Formula (A) and a diol unit (B) represented by Formula (B), and a charge transport material, and in a case where a value A is a weight-average molecular weight Mw of the polyester resin (1) contained in the single layer type photosensitive layer divided by 10,000 (A=Mw/10,000), and a value of a ratio M1/M2 of a mass M1 of the charge transport material contained in the single layer type photosensitive layer to a mass M2 of the single layer type photosensitive layer is defined as Ct, and an average thickness of the single layer type photosensitive layer is defined as Dt (μm), expressions of $5 \leq A \leq 40$, $0.40 \leq Ct \leq 0.60$, $27 \leq Dt \leq 50$, and $2.5 \leq (A \times Dt)/(Ct \times 100) \leq 48.0$ are satisfied.

(10)

The electrophotographic photoreceptor according to (9), in which an expression of $3.5 \leq (A \times Dt)/(Ct \times 100) \leq 40.0$ is satisfied.

(11)

The electrophotographic photoreceptor according to (9) or (10), in which an expression of $30 \leq Dt \leq 48$ is satisfied.

(12)

The electrophotographic photoreceptor according to any one of (9) to (11), in which an expression of $6 \leq A \leq 30$ is satisfied.

(13)

The electrophotographic photoreceptor according to any one of (9) to (12), in which a mass proportion of the dicarboxylic acid unit (A) in the polyester resin (1) is 15% by mass or greater and 60% by mass or less.

(14)

The electrophotographic photoreceptor according to any one of (9) to (13), in which $n^1$ in Formula (A) represents 2.

(15)

The electrophotographic photoreceptor according to any one of (9) to (14), in which in Formula (B), at least one of $Rb^1$ or $Rb^2$ represents a linear alkyl group having 4 or more and 10 or less carbon atoms, a branched alkyl group having 4 or more and 10 or less carbon atoms, an aryl group having 6 or more and 10 or less carbon atoms, or an aralkyl group having 7 or more and 10 or less carbon atoms, or $Rb^1$ and $Rb^2$ are bonded to each other to form a cyclic alkyl group having 5 or more and 12 or less carbon atoms.

(16)

The electrophotographic photoreceptor according to any one of (9) to (15), in which in Formula (B), at least one of $Rb^1$ or $Rb^2$ represents a linear alkyl group having 4 or more and 10 or less carbon atoms or a branched alkyl group having 4 or more and 10 or less carbon atoms.

(17)

A process cartridge including: the electrophotographic photoreceptor according to any one of (1) to (16), in which the process cartridge is attachable to and detachable from an image forming apparatus.

(18)

An image forming apparatus including: the electrophotographic photoreceptor according to any one of (1) to (16); a charging unit that charges a surface of the electrophotographic photoreceptor; an electrostatic latent image forming unit that forms an electrostatic latent image on the surface of the charged electrophotographic photoreceptor; a developing unit that develops the electrostatic latent image formed on the surface of the electrophotographic photoreceptor with a developer containing a toner to form a toner image; and a transfer unit that transfers the toner image to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophotographic photoreceptor comprising:

a conductive substrate; and a lamination type photosensitive layer disposed on the conductive substrate and including a charge generation layer and a charge transport layer, wherein the charge transport layer contains a polyester resin (1) having a dicarboxylic acid unit (A) represented by Formula (A) and a diol unit (B) represented by Formula (B), and a charge transport material, and in a case where a value A is a weight-average molecular weight Mw of the polyester resin (1) contained in the charge transport layer divided by 10,000 (A=Mw/10,000), a value of a ratio M1/M2 of a mass M1 of the charge transport material contained in the charge transport layer to a mass M2 of the charge transport layer is defined as Cs, and an average thickness of the charge transport layer is defined as Ds (μm), expressions of $5 \leq A \leq 40$, $0.28 \leq Cs \leq 0.55$, $27 \leq Ds \leq 50$, and $2.5 \leq (A \times Ds)/(Cs \times 100) \leq 70.0$ are satisfied, Formula (A)

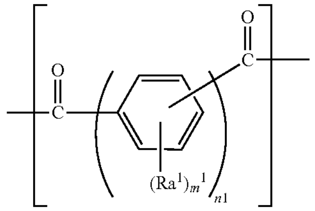

Formula (B)

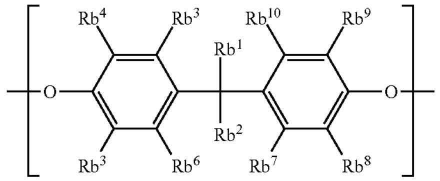

in Formula (A), $n^1$ represents 1, 2, or 3, $m^1$'s each independently represent 0, 1, 2, 3, or 4, $Ra^1$'s each independently represent an alkyl group having 1 or more and 10 or less carbon atoms, an aryl group having 6 or more and 12 or less carbon atoms, or an alkoxy group having 1 or more and 6 or less carbon atoms, in Formula (B), $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, $Rb^3$, $Rb^4$, $Rb^5$, $Rb^6$, $Rb^7$, $Rb^8$, $Rb^9$, and $Rb^{10}$ each independently represent a hydrogen atom, an alkyl group having 1 or more and 10 or less carbon atoms, an aryl group having 6 or more and 12 or less carbon atoms, an aralkyl group having 7 or more and 20 or less carbon atoms, or an alkoxy group having 1 or more and 6 or less carbon atoms, and $Rb^1$ and $Rb^2$ may be bonded to each other to form a cyclic alkyl group.

2. The electrophotographic photoreceptor according to claim 1, wherein an expression of 3.6≤(A×Ds)/(Cs×100)≤46.0 is satisfied.

3. The electrophotographic photoreceptor according to claim 1, wherein an expression of 30≤Ds≤48 is satisfied.

4. The electrophotographic photoreceptor according to claim 1, wherein an expression of 6≤A≤30 is satisfied.

5. The electrophotographic photoreceptor according to claim 1, wherein a mass proportion of the dicarboxylic acid unit (A) in the polyester resin (1) is 15% by mass or greater and 60% by mass or less relative to a total mass of the polyester resin (1).

6. The electrophotographic photoreceptor according to claim 1, wherein $n^1$ in Formula (A) represents 2.

7. The electrophotographic photoreceptor according to claim 1, wherein in Formula (B), at least one of $Rb^1$ and $Rb^2$ represents a linear alkyl group having 4 or more and 10 or less carbon atoms, a branched alkyl group having 4 or more and 10 or less carbon atoms, an aryl group having 6 or more and 10 or less carbon atoms, an aralkyl group having 7 or more and 10 or less carbon atoms, or $Rb^1$ and $Rb^2$ are bonded to each other to form a cyclic alkyl group having 5 or more and 12 or less carbon atoms.

8. The electrophotographic photoreceptor according to claim 1, wherein in Formula (B), at least one of $Rb^1$ and $Rb^2$ represents a linear alkyl group having 4 or more and 10 or less carbon atoms or a branched alkyl group having 4 or more and 10 or less carbon atoms.

9. An electrophotographic photoreceptor comprising:

a conductive substrate; and a single layer type photosensitive layer disposed on the conductive substrate, wherein the single layer type photosensitive layer contains a polyester resin (1) having a dicarboxylic acid unit (A) represented by Formula (A) and a diol unit (B) represented by Formula (B), and a charge transport material, and in a case where a value A is a weight-average molecular weight Mw of the polyester resin (1) contained in the single layer type photosensitive layer divided by 10,000 (A=Mw/10,000), a value of a ratio M1/M2 of a mass M1 of the charge transport material contained in the single layer type photosensitive layer to a mass M2 of the single layer type photosensitive layer is defined as Ct, and an average thickness of the single layer type photosensitive layer is defined as Dt (μm), expressions of 5≤A≤40, 0.40≤Ct≤0.60, 27≤Dt≤50, and 2.5≤(A×Dt)/(Ct×100)≤48.0 are satisfied, Formula (A)

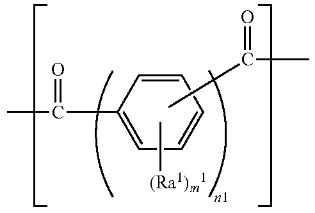

Formula (B)

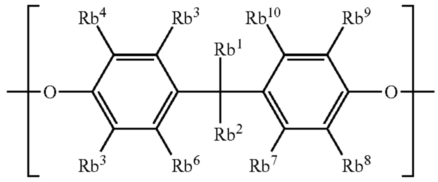

in Formula (A), $n^1$ represents 1, 2, or 3, $m^1$'s each independently represent 0, 1, 2, 3, or 4, $Ra^1$'s each independently represent an alkyl group having 1 or more and 10 or less carbon atoms, an aryl group having 6 or more and 12 or less carbon atoms, or an alkoxy group having 1 or more and 6 or less carbon atoms, in Formula (B), $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, $Rb^3$, $Rb^4$, $Rb^5$, $Rb^6$, $Rb^7$, $Rb^8$, $Rb^9$, and $Rb^{10}$ each independently represent a hydrogen atom, an alkyl group having 1 or more and 10 or less carbon atoms, an aryl group having 6 or more and 12 or less carbon atoms, an aralkyl group having 7 or more and 20 or less carbon atoms, or an alkoxy group having 1 or more and 6 or less carbon atoms, and $Rb^1$ and $Rb^2$ may be bonded to each other to form a cyclic alkyl group.

10. The electrophotographic photoreceptor according to claim 9, wherein an expression of 3.5≤(A× Dt)/(Ct×100)≤40.0 is satisfied.

11. The electrophotographic photoreceptor according to claim 9, wherein an expression of 30≤Dt≤48 is satisfied.

12. The electrophotographic photoreceptor according to claim 9, wherein an expression of 6≤A≤30 is satisfied.

13. The electrophotographic photoreceptor according to claim 9, wherein a mass proportion of the dicarboxylic acid unit (A) in the polyester resin (1) is 15% by mass or greater and 60% by mass or less relative to a total mass of the polyester resin (1).

14. The electrophotographic photoreceptor according to claim 9, wherein $n^1$ in Formula (A) represents 2.

15. The electrophotographic photoreceptor according to claim 9, wherein in Formula (B), at least one of $Rb^1$ and $Rb^2$ represents a linear alkyl group having 4 or more and 10 or less carbon atoms, a branched alkyl group having 4 or more and 10 or less carbon atoms, an aryl group having 6 or more and 10 or less carbon atoms, an aralkyl group having 7 or more and 10 or less carbon atoms, or $Rb^1$ and $Rb^2$ are bonded to each other to form a cyclic alkyl group having 5 or more and 12 or less carbon atoms.

16. The electrophotographic photoreceptor according to claim 9, wherein in Formula (B), at least one of $Rb^1$ and $Rb^2$ represents a linear alkyl group having 4 or more and 10 or less carbon atoms or a branched alkyl group having 4 or more and 10 or less carbon atoms.

17. A process cartridge comprising:

the electrophotographic photoreceptor according to claim 1, wherein the process cartridge is attachable to and detachable from an image forming apparatus.

18. An image forming apparatus comprising:

the electrophotographic photoreceptor according to claim 1;

a charging unit that charges a surface of the electrophotographic photoreceptor;

an electrostatic latent image forming unit that forms an electrostatic latent image on the surface of the charged electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

19. The electrophotographic photoreceptor according to claim 1, wherein in Formula (A), $n^1$ represents 2 or 3.

20. The electrophotographic photoreceptor according to claim 9, wherein in Formula (A), $n^1$ represents 2 or 3.

* * * * *